(12) United States Patent
Lauret

(10) Patent No.: US 10,655,816 B2
(45) Date of Patent: May 19, 2020

(54) OPTICAL SYSTEM FOR NON-IMAGING COLLIMATION OF MAXIMUM LIGHT INTENSITY

(71) Applicant: GAGGIONE SAS, Montréal-la-Cluse (FR)

(72) Inventor: Jean-Pierre Lauret, Oyonnax (FR)

(73) Assignee: GAGGIONE SAS, Montreal-la-Cluse (FR)

( * ) Notice: Subject to any disclaimer, the term of this patent is extended or adjusted under 35 U.S.C. 154(b) by 3 days.

(21) Appl. No.: 15/748,758

(22) PCT Filed: Jul. 27, 2016

(86) PCT No.: PCT/FR2016/051946
§ 371 (c)(1),
(2) Date: Jan. 30, 2018

(87) PCT Pub. No.: WO2017/017375
PCT Pub. Date: Feb. 2, 2017

(65) Prior Publication Data
US 2019/0024872 A1    Jan. 24, 2019

(30) Foreign Application Priority Data

Jul. 30, 2015  (FR) .................................. 15 57347

(51) Int. Cl.
*F21V 3/00*     (2015.01)
*F21V 5/00*     (2018.01)
*F21V 7/00*     (2006.01)
*G02B 19/00*    (2006.01)
*G02B 3/00*     (2006.01)
*G02B 27/09*    (2006.01)
(Continued)

(52) U.S. Cl.
CPC ............ *F21V 7/0091* (2013.01); *F21V 5/004* (2013.01); *G02B 3/0056* (2013.01); *G02B 19/0028* (2013.01); *G02B 19/0061* (2013.01); *G02B 27/0905* (2013.01); *G02B 27/0961* (2013.01); *F21W 2131/406* (2013.01); *F21Y 2101/00* (2013.01); *F21Y 2113/10* (2016.08)

(58) Field of Classification Search
CPC ............... F21V 5/00–10; F21V 7/0091; G02B 3/00–0068; G02B 19/0028; G02B 19/0061; G02B 27/09–0961
USPC ........................ 362/311.01–311.15, 326–340
See application file for complete search history.

(56) References Cited

U.S. PATENT DOCUMENTS

2011/0102886 A1    5/2011  Yamamura

FOREIGN PATENT DOCUMENTS

EP        0395156 A1    10/1990
EP        0563874 A1    10/1993
(Continued)

OTHER PUBLICATIONS

English Translation to Abstract WO2009016586.
(Continued)

*Primary Examiner* — Jason M Han
(74) *Attorney, Agent, or Firm* — Cantor Colburn LLP

(57) ABSTRACT

An optical system configured such that the relation between the incident angle and the emergence distance of the emergent optical beam relative to the main optical axis is proportionally decreasing so as to mix the colours in a homogeneous manner, and an emergent surface textured so as to make uniform the homogenisation of the additive synthesis. The image of the light source is uniformly homogeneous and decorrelated from the shape of same.

20 Claims, 7 Drawing Sheets

(51) Int. Cl.
*F21W 131/406* (2006.01)
*F21Y 113/10* (2016.01)
*F21Y 101/00* (2016.01)

(56) References Cited

FOREIGN PATENT DOCUMENTS

| | | |
|---|---|---|
| EP | 06563874 A1 | 10/1993 |
| EP | 2846179 A2 | 3/2015 |
| WO | 2009016586 A1 | 2/2009 |
| WO | 2012171439 A1 | 12/2012 |

OTHER PUBLICATIONS

English Translation to Abstract WO2012171439.
International Search Report for Application No. PCT/FR2016/051946.
Written Opinion for Application No. PCT/FR2016/051946.

OPTICAL SYSTEM FOR NON-IMAGING COLLIMATION OF MAXIMUM LIGHT INTENSITY

CROSS REFERENCE TO RELATED APPLICATIONS

This application is a National Stage of PCT Application No. PCT/FR2016/051946 filed on Jul. 27, 2016, which claims priority to French Patent Application Ser. No. 15/57347 filed on Jul. 30, 2015, the contents each of which are incorporated herein by reference thereto.

FIELD OF THE INVENTION

The field of the present invention is that of lighting devices. It concerns, particularly but not exclusively, the field of optical systems for projectors, for example for projectors used for shows, in particular for lighting a scene. More specifically, the present invention concerns the optical systems for homogenizing and uniformizing the additive synthesis of a set of beams of light rays relative to a main optical axis from a light source.

BACKGROUND

Nowadays, scene or show projectors are constituted by a light source constituted for example by a bulb, a discharge or incandescent lamp or still by monochromatic or polychromatic light-emitting diodes in order to obtain a color or a range of colors by additive synthesis. In the case of projectors provided with light-emitting diodes, the projectors are provided, to this end, with a (parabolic or elliptical) reflector for collimating the light beam coming from this light source toward a Köhler (Koehler) integrator for example thereby enabling an additive synthesis of the wavelengths comprised in the beams of light rays.

This additive synthesis phenomenon is perceived by the human eye by means of photoreceptors present in the retina: the cones. In general, these photoreceptors are divided into three types of cones and each of the types has sensitivity to a range of wavelengths. Thus, a better perception of colors is enabled to humans. Of course, the term «synthesis» is an abuse of language or, in other words, the colors mixture process takes place only in the brain. Anyway, this additive synthesis creates the illusion of a given color.

In practice, the collimators forming the related art are designed to shape the light beams of the light-emitting diodes, better known by the acronym «LED», and, in particular, the light beams of multi-chip Red, Green and Blue LEDs, also called RGB LEDs. In general, a White chip is associated to the Red, Green and Blue chips. This last configuration, called LED RGBW, enables a more nuanced and rich color synthesis. The collimators adapted to RGBW LEDs according to the related art comprise a central portion architected so as not to form the image of the chip using a set of confocal diopters for example and a peripheral portion configured so as to divert the light toward a network of micro-lenses for example in order to improve the rendering.

The central portion of a collimator adapted to RGBW LEDs according to related art places restrictions on the entire geometry of the collimator, on the size of the LED and on the angle of the projected beam. Thus, the geometry of a collimator adapted to RGBW LEDs according to the related art is bulkier than that of a conventional collimator provided for a white LED. A collimator adapted to RGBW LEDs according to the related art operates in an optimal manner only for one single size of LEDs, and the angle of the projected beam, in particular the angle of the beam projected by the central portion, is larger than the asymptote defined by the throughput sources.

Hence, there is a need for an optical system allowing providing a uniform and homogenous colors mixture from an RGBW LED, while guaranteeing the smallest possible throughput sources, in order to reduce as much as possible the angle of the projected light beam.

BRIEF SUMMARY

The present invention aims at solving all or part of the aforementioned problems in the form of an optical system made of a material transparent to wavelengths comprised in a set of beams of light rays and intended to align said set of beams of light rays relative to a main optical axis from a light source comprising an emission axis and at least one emitting surface of light rays intended to be emitted in a space with a refractive index greater than or equal to one; said optical system comprising:
   a first incident surface comprises a first proximal singular point located on the main optical axis;
   a first emergent surface comprises a first distal singular point located on the main optical axis;
the first incident surface and the first emergent surface are configured so as to define an intermediate focus area located between the first incident surface (210) and the first emergent surface (410).

Thanks to the arrangements according to the invention, the optical system allows aligning the set of beams of light rays relative to the main optical axis from the light source.

The optical system may further have one or more of the following features, considered alone or in combination.

According to one embodiment, the first distal singular point is configured to form a pole of the first emergent surface.

According to one embodiment, the first proximal singular point is configured to form a pole of the first incident surface.

According to one embodiment, the intermediate focus area has a rotationally symmetric shape.

According to one embodiment, the optical system comprises a second incident surface, a second emergent surface, and a lateral surface configured to reflect by total internal reflection the light rays coming from the second incident surface toward the second emergent surface so that the light rays emerging from the second emergent surface are comprised within an angle comprised between 0° and 10°, in particular between 0° and 5° and preferably between 0° and 3° with respect to the main optical axis.

According to one embodiment, the rays emerging from the first emergent surface and the rays emerging from the second emergent surface emerge at an angle comprised between 0° and 10°, in particular between 0° and 5° and preferably between 0° and 3° with respect to the main optical axis.

According to one embodiment, the optical system comprises a three-dimensional texture set. Thus, thanks to this arrangement, the color mixture is improved.

According to one embodiment, the three-dimensional texture set comprises:
   a first three-dimensional texture disposed on the first emergent surface so as to form a first textured surface; and a second three-dimensional texture disposed on the second emergent surface so as to form a second textured surface.

Thus, thanks to this arrangement, the beams of light rays are mixed so as to obtain a homogenous color.

According to one embodiment, the first three-dimensional texture comprises at least one first elementary pattern orientated on the first textured surface according to at least one vector of a primary reference frame. Thus, thanks to this arrangement, the color mixture is homogenously performed.

According to one embodiment, the primary reference frame is defined in Cartesian coordinates. Thus, thanks to this arrangement, the orientation of the elementary pattern allows homogenizing the color.

According to one embodiment, the first textured surface has a surface devoid of any recessed or protruding sharp ridge.

In other words, the first textured surface has a continuous and two-times derivable surface.

According to one embodiment, the first three-dimensional texture has a surface devoid of any recessed or protruding sharp ridge. In other words, the first three-dimensional textured has a continuous and two-times derivable surface. In other words, the first three-dimensional texture has a continuous local slope. In other words, the first three-dimensional texture has neither a recessed sharp ridge nor a protruding sharp ridge. Thus, thanks to this arrangement, the first three-dimensional texture avoids any formation of parasitic images.

According to one embodiment, the second three-dimensional texture comprises at least one second elementary pattern orientated on the second emergent surface according to at least one vector of a secondary reference frame. Thus, thanks to this arrangement, the color mixture is homogenously performed.

According to one embodiment, the secondary reference frame is defined in cylindrical coordinates. Thus, thanks to this arrangement, the orientation of the elementary pattern allows homogenizing the color.

According to one embodiment, the secondary reference frame is defined in polar coordinates. Thus, thanks to this arrangement, the orientation of the elementary pattern allows homogenizing the color.

According to one embodiment, the secondary reference frame is centered on the main optical axis. Thus, thanks to this arrangement, the elementary pattern is centered on the main optical axis.

According to one embodiment, the second textured surface has a surface devoid of any recessed or protruding sharp ridge.

In other words, the second three-dimensional texture has a continuous and two-times derivable surface.

According to one embodiment, the second three-dimensional texture has a surface devoid of any recessed or protruding sharp ridge. In other words, the second three-dimensional texture has a continuous and two-times derivable surface. In other words, the second three-dimensional texture has a continuous local slope. In other words, the second three-dimensional texture has neither a recessed sharp ridge nor a protruding sharp ridge. Thus, thanks to this arrangement, the second texture avoids any formation of parasitic images.

According to one embodiment, the first elementary pattern is repeated by translation. Thus, thanks to this arrangement, the first elementary pattern has a homogenous distribution.

According to one embodiment, the second elementary pattern is repeated by rotation about the main optical axis. Thus, thanks to this arrangement, the second elementary pattern has a homogenous distribution.

According to one embodiment, the second elementary pattern is repeated by homothety about the main optical axis. Thus, thanks to this arrangement, the second elementary pattern is proportional depending on its distance to the center.

According to one embodiment, the optical system comprises a housing configured to receive said light source via an opening enabling access to the housing at the level of a positioning location intended to receive completely or partially the light source. Thus, thanks to this arrangement, the light source is housed within the optical system.

According to one embodiment, the optical system comprises a support. Thus, thanks to this arrangement, the optical system is supported.

According to one embodiment, the second emergent surface and the first emergent surface are delimited by a second distal singular point. Thus, thanks to this arrangement, the second distal singular point allows delimiting the first emergent surface from the second emergent surface.

According to one embodiment, the second incident surface and the first incident surface are delimited by a second proximal singular point. Thus, thanks to this arrangement, the second proximal singular point allows delimiting the first incident surface from the second incident surface.

According to one embodiment, the first emergent surface has a hemi-toroidal shape. In other words, the first emergent surface has a zero-collar half-torus shape. Thus, thanks to this arrangement, the first emergent surface is configured to enable the color mixture.

According to one embodiment, the first incident surface has a hemi-toroidal shape. In other words, the first incident surface has a zero-collar half-torus shape. Thus, thanks to this arrangement, the first incident surface is configured to enable the color mixture.

According to one embodiment, the singular point of the first incident surface and the singular point of the first emergent surface are located on the main optical axis of the optical system. Thus, thanks to this arrangement, the incident light rays do not cross the main optical axis, which avoids the projection of the image of the light sources.

According to one embodiment, the optical system is configured so that the light rays coming from the light source and whose incidence area is close to the main optical axis comprise an emergence area enabling the emergence of the emergent light rays in the proximity of the second distal singular point.

Thanks to the arrangements according to the invention, the optical system allows reversing the light rays with respect to the optical axis, which enables the optical system to be non-imaging.

According to one embodiment, the first incident surface is defined by a first incident optical element and the first emergent surface is defined by a first emergent optical element, the first incident optical element and the first emergent optical element forming an aspheric optical element.

According to one embodiment, the lateral surface is configured to reflect by total internal reflection the light rays coming from the second incident surface toward the second emergent surface so that the light rays emerging from the second emergent surface are comprised within an angle between 0° and 10°, in particular between 0° and 5° and preferably between 0° and 3° with respect to the main optical axis and to the light ray emerging from the first emergent surface.

According to one embodiment, the second emergent surface is disposed laterally with respect to the first emergent surface.

According to one embodiment, the first emergent surface and the second emergent surface comprise a distal common boundary.

According to one embodiment, the first incident surface and the second incident surface comprise a proximal common boundary. Thus, thanks to this arrangement, the light rays coming from the first incident surface are guided toward the first emergent surface and the light rays coming from the second incident surface are guided toward the second emergent surface.

According to one embodiment, the second emergent surface is disposed laterally with respect to the first emergent surface.

According to one embodiment, the first emergent surface and the second emergent surface comprise a common boundary. In particular, the second emergent surface delimits a lateral edge of the first emergent surface. Thus, thanks to these arrangements, the bulk of the optical system is reduced.

According to one embodiment, the second emergent surface defines a second emergent optical element. Thus, thanks to this arrangement, the light rays coming from the second incident surface are guided by refraction.

According to one embodiment, the optical system further comprises a peripheral seat. Thus, thanks to this arrangement, the optical system may be set in place.

According to one embodiment, the peripheral seat comprises a setup plane. Thus, thanks to this arrangement, the peripheral seat may be disposed on the setup plane.

According to one embodiment, the peripheral seat further comprises an opening comprised within the setup plane. Thus, thanks to this arrangement, the light source may be placed in the cavity at the level of the opening.

According to one embodiment, the first incident surface is defined by a first incident optical element.

According to one embodiment, the first incident optical element and the first emergent optical element form a biconvex aspheric optical element. Thus, thanks to this arrangement, the optical system accurately focuses the incident light rays at the first incident surface.

According to one embodiment, the second incident surface is defined by a second incident optical element.

According to one embodiment, the first incident optical element and the second incident optical element completely or partially form the cavity. Thus, thanks to this arrangement, when the light source is introduced into the cavity, the light source faces the incident optical elements.

According to one embodiment, the first incident surface and the second incident surface comprise an intersection area. Thus, thanks to this arrangement, the intersection area allows delimiting the first incident surface from the second incident surface.

According to one embodiment, the first incident surface and the second incident surface comprise a second proximal singular point. Thus, thanks to this arrangement, the second proximal singular point allows delimiting the first incident surface from the second incident surface.

According to one embodiment, the first incident surface and the second incident surface comprise a common second proximal singular point. Thus, thanks to this arrangement, the common second proximal singular point allows delimiting the first incident surface from the second incident surface.

According to one embodiment, the first incident surface and the second incident surface comprise a proximal singular line. Thus, thanks to this arrangement, the proximal singular line allows delimiting the first incident surface from the second incident surface.

According to one embodiment, the first incident surface and the second incident surface comprise a common proximal singular line. Thus, thanks to this arrangement, the common proximal singular line allows delimiting the first incident surface from the second incident surface.

According to one embodiment, the first incident surface and the second incident surface comprise a second proximal cusp point. Thus, thanks to this arrangement, the second proximal cusp point allows delimiting the first incident surface from the second incident surface.

According to one embodiment, the first incident surface and the second incident surface comprise a proximal cusp line. Thus, thanks to this arrangement, the proximal cusp line allows delimiting the first incident surface from the second incident surface.

According to one embodiment, the intersection area is a second proximal singular point. Thus, thanks to this arrangement, the second proximal singular point allows delimiting the first incident surface from the second incident surface.

According to one embodiment, the intersection area is a common second proximal singular point. Thus, thanks to this arrangement, the common second proximal singular point allows delimiting the first incident surface from the second incident surface.

According to one embodiment, the intersection area is a proximal singular line. Thus, thanks to this arrangement, the proximal singular line allows delimiting the first incident surface from the second incident surface.

According to one embodiment, the intersection area is a common proximal singular line. Thus, thanks to this arrangement, the common proximal singular line allows delimiting the first incident surface from the second incident surface.

According to one embodiment, the second proximal singular point is a second proximal cusp point. Thus, thanks to this arrangement, the second proximal cusp point allows delimiting the first incident surface from the second incident surface.

According to one embodiment, the common second proximal singular point is a second proximal cusp point. Thus, thanks to this arrangement, the second proximal cusp point allows delimiting the first incident surface from the second incident surface.

According to one embodiment, the proximal singular line is a proximal cusp line. Thus, thanks to this arrangement, the second proximal cusp point allows delimiting the first incident surface from the second incident surface.

According to one embodiment, the common proximal singular line is a proximal cusp line. Thus, thanks to this arrangement, the proximal cusp line allows delimiting the first incident surface from the second incident surface.

According to one embodiment, the central body is integrally made with the peripheral body. Thus, thanks to this arrangement, the light loss is minimized between the peripheral body and the central body.

According to one embodiment, the first emergent optical element and the second emergent optical element are integrally made with the main body. Thus, thanks to this arrangement, the light loss is minimized between the emergent optical elements and the main body.

According to one embodiment, the first incident surface and the second incident surface are configured to form an incident diopter.

According to one embodiment, the first emergent surface and the second emergent surface are configured to form an emergent diopter.

According to one embodiment, the incident diopter is configured to form a cavity. Thus, thanks to this arrangement, only the light rays coming from the light source are refracted toward the emergent diopter.

According to one embodiment, the housing comprises a positioning location enabling the light rays coming from the light source to be refracted by the incident diopter toward the emergent diopter. Thus, thanks to this arrangement, the light rays of the light source are placed in the main object focus area in order to emerge through the emergent diopter substantially parallel to the main optical axis.

According to one embodiment, the housing extends the cavity. Thus, thanks to this arrangement, the light source is housed within the optical system.

According to one embodiment, the housing is an extension of the cavity. Thus, thanks to this arrangement, the light source is housed within the optical system.

According to one embodiment, the main object focus area comprises a main focal plane.

According to one embodiment, the main focal plane is configured to form an interface between the housing and the cavity. Thus, thanks to this arrangement, the light source is placed in the housing and the emitting surface at the level of the interface between the housing and the cavity.

According to one embodiment, the first emergent surface and the second emergent surface comprise a common second distal singular point. Thus, thanks to this arrangement, the common second distal singular point allows delimiting the first emergent surface from the second emergent surface.

According to one embodiment, the first emergent surface and the second emergent surface comprise a distal singular line. Thus, thanks to this arrangement, the distal singular line allows delimiting the first emergent surface from the second emergent surface.

According to one embodiment, the first emergent surface and the second emergent surface comprise a common distal singular line. Thus, thanks to this arrangement, the common distal singular line allows delimiting the first emergent surface from the second emergent surface.

According to one embodiment, the first emergent surface and the second emergent surface comprise a second distal cusp point. Thus, thanks to this arrangement, the second distal cusp point allows delimiting the first emergent surface from the second emergent surface.

According to one embodiment, the first emergent surface and the second emergent surface comprise a distal cusp line. Thus, thanks to this arrangement, the distal cusp line allows delimiting the first emergent surface from the second emergent surface.

According to one embodiment, the intersection area is a second distal singular point. Thus, thanks to this arrangement, the second distal singular point allows distinguishing the first emergent surface from the second emergent surface.

According to one embodiment, the intersection area is a common second distal singular point. Thus, thanks to this arrangement, the common second distal singular point allows distinguishing the first emergent surface from the second emergent surface.

According to one embodiment, the second distal singular point is a distal cusp line. Thus, thanks to this arrangement, the second distal cusp point allows delimiting the first emergent surface from the second emergent surface.

According to one embodiment, the distal singular line is a distal cusp line. Thus, thanks to this arrangement, the distal cusp line allows delimiting the first emergent surface from the second emergent surface.

According to one embodiment, the main body is integrally made with the first incident optical element. Thus, thanks to this arrangement, the light loss is minimized between the first incident optical element and the main body.

According to one embodiment, the main body is integrally made with the second incident optical element. Thus, thanks to this arrangement, the light loss is minimized between the second incident optical element and the main body.

According to one embodiment, the first emergent surface is next to the second emergent surface. Thus, thanks to this arrangement, the light loss is minimized between the first emergent surface and the second emergent surface.

According to one embodiment, the first emergent surface is adjacent to the second emergent surface. Thus, thanks to this arrangement, the light loss is minimized between the first emergent surface and the second emergent surface.

According to one embodiment, the first emergent surface comprises a first emergent optical element. Thus, thanks to this arrangement, the first emergent surface can modify the trajectory of the light rays.

According to one embodiment, the second emergent surface comprises a second emergent optical element. Thus, thanks to this arrangement, the second emergent surface can modify the trajectory of the light rays.

According to one embodiment, the second emergent element is disposed laterally with respect to the first emergent optical element. According to one embodiment, the first emergent optical element and the second emergent element comprise a common boundary. In particular, the second emergent element delimits the lateral edge of the first emergent optical element. Thus, thanks to these arrangements, the bulk of the optical system is reduced. Thus, thanks to this arrangement, the set of light rays emitted at the periphery of the light source may be directed substantially in the direction of the optical axis.

According to one embodiment, the end of the second emergent surface is adjacent to the end of the first emergent surface. Thus, thanks to this arrangement, the light loss is minimized between the first emergent surface and the second emergent surface.

According to one embodiment, the optical system further comprises an axial symmetry with respect to the main optical axis. Thus, thanks to this arrangement, the set of emergent light rays is substantially symmetrical with respect to the main optical axis.

According to one embodiment, the optical system further comprises a planar symmetry with respect to at least one plane passing through the main optical axis. Thus, thanks to this arrangement, the set of emergent light rays is substantially symmetrical with respect to the main optical axis.

According to one embodiment, the optical system further comprises a rotational symmetry with respect to the main optical axis. Thus, thanks to this arrangement, the set of emergent light rays is substantially symmetrical with respect to the main optical axis.

According to one embodiment, the first incident surface is configured to refract the light rays coming from the light source toward the first emergent surface so that the light rays emerging from the first emergent surface are comprised within an angle between 0° and 10°, in particular between 0° and 5° and preferably between 0° and 3° with respect to the main optical axis. Thus, thanks to this arrangement, the set of emergent light rays is substantially parallel to the main optical axis.

According to one embodiment, the lateral surface is configured to reflect by total internal reflection the light rays coming from the second incident surface toward the second emergent surface so that the light rays emerging from the second emergent surface are comprised within an angle comprised between 0° and 10°, in particular between 0° and 5° and preferably between 0° and 3° with respect to the main optical axis and to the emergent light ray of the first emergent surface. Thus, thanks to this arrangement, the set of emergent light rays is substantially parallel to the main optical axis. By parallel, is generally meant an angle comprised between 0° and 10°, in particular between 0° and 5° and preferably between 0° and 3° with respect to a reference.

According to one embodiment, the first emergent surface comprises a convex shape. Thus, thanks to this arrangement, the first emergent surface allows forming a convergent surface.

According to one embodiment, the second emergent surface has a convex shape. Thus, thanks to this arrangement, the second emergent surface allows forming a convergent surface.

According to one embodiment, the first incident surface comprises a convex shape. Thus, thanks to this arrangement, the first incident surface allows forming a convergent surface.

According to one embodiment, the set formed by the first incident surface and by the first emergent surface comprises an object focus located in the vicinity of the light source. Thus, thanks to this arrangement, the set formed by the first incident surface and by the first emergent surface allows focusing the light rays.

According to one embodiment, the first emergent surface comprises an intermediate focus area located inside the optical system. Thus, thanks to this arrangement, the intermediate focus area enables the optical system to make the light rays converge.

According to one embodiment, the intermediate focus area comprises a planar symmetry with respect to at least one plane passing through the main optical axis. Thus, thanks to this arrangement, the set of emergent light rays is substantially symmetrical with respect to the main optical axis.

According to one embodiment, the intermediate focus area may be linear, triangular, rectangular, circular or it may have a geometric shape whose number of sides may be at least five. Thus, thanks to this arrangement, the set of emergent light rays is substantially symmetrical with respect to the main optical axis.

According to one embodiment, the intermediate focus area is comprised in a plane passing through the main optical axis. Thus, thanks to this arrangement, the set of emergent light rays is substantially symmetrical with respect to the main optical axis.

According to one embodiment, the intermediate focus area comprises a rotational symmetry with respect to the main optical axis.

According to one embodiment, the intermediate focus area may be annular. Thus, thanks to this arrangement, the set of emergent light rays is substantially symmetrical with respect to the main optical axis.

According to one embodiment, the second emergent surface comprises a set of ends. Thus, thanks to this arrangement, the second emergent surface may be clearly defined.

According to one embodiment, the lateral surface comprises a set of ends. Thus, thanks to this arrangement, the lateral surface may be clearly defined.

According to one embodiment, the intermediate focus area is comprised between the second proximal singular point and the second singular point.

According to one embodiment, the first emergent surface focuses the light coming from the intermediate focus area, at an angle comprised between 0° and 10°, in particular between 0° and 5° and preferably between 0° and 3° with respect to the main optical axis. Thus, thanks to this arrangement, the light rays emerging from the first emergent surface emerge with respect to the main optical axis.

According to one embodiment, the lateral surface is configured to sort out the incident light rays at the second incident surface. Thus, thanks to this arrangement, the optical system allows reaching the minimum limits provided for by the throughput sources law and a proper colors mixture.

According to one embodiment, the first emergent surface is configured to reverse the incident light rays at the first incident surface via the intermediate focus area. Thus, thanks to this arrangement, the light fraction collected by the first incident surface forms no image of the LED. Indeed, reversing and sorting out again the light rays prevents the fulfillment of the conditions of geometrical optics, in particular aplanatism, which is necessary to the formation of images.

According to one embodiment, the lateral surface is configured so that the light rays whose emission angle is close to the setup plane intersect the light rays whose emission angle is close to the first incident surface at an intersection point located between the second incident surface and the lateral surface. Thus, thanks to this arrangement, the light rays are reversed so as not to project the image of the light sources.

According to one embodiment, the lateral surface is configured so that the reflected light rays intersect the light rays refracted by the second incident surface at an intersection point located between the second incident surface and the lateral surface. Thus, thanks to this arrangement, the light rays are reversed so as not to project the image of the light sources.

According to one embodiment, the optical system is configured so that the light rays reflected by the lateral surface intersect the light rays refracted by the second incident surface at an intersection point located between the second incident surface and the lateral surface. Thus, thanks to this arrangement, the light rays are reversed so as not to project the image of the light sources.

According to one embodiment, the first incident surface has a convex surface. Thus, thanks to this arrangement, the light rays can converge.

According to one embodiment, the first incident surface comprises a first incident optical element. Thus, thanks to this arrangement, the light rays may be redirected.

According to one embodiment, the second incident surface comprises a second incident optical element. Thus, thanks to this arrangement, the light rays may be redirected.

According to one embodiment, the optical system is made of a polymer configured to allow easy replication of complex shapes by molding.

According to one embodiment, the optical system is made of silicon. Thus, thanks to this arrangement, the optical system can resist high light densities.

According to one embodiment, the optical system is made of Poly(methyl methacrylate). Thus, thanks to this arrangement, the optical system is transparent to the wavelengths emitted by the light source.

According to one embodiment, the silicon is configured to resist light densities higher than 2 $W/cm^2$, in particular higher than 3 $W/cm^2$ and in particular higher than 4 $W/cm^2$. Thus, thanks to this arrangement, the structure of the optical material is not altered by the high light density emitted by the light source.

According to one embodiment, the silicon is configured to resist light densities whose wavelength range is shorter than 470 nm, in particular shorter than 460 nm and preferably shorter than 440 nm. Thus, thanks to this arrangement, the optical system does not turn yellow in the presence of a high density of blue light.

According to one embodiment, the first three-dimensional texture has a first network of elementary patterns. Thus, thanks to this arrangement, the color mixture is homogenous.

According to one embodiment, the first network of elementary patterns is configured to be dependent on the curvature of the first emergent surface. Thus, thanks to this arrangement, the geometry of the first network of elementary patterns and the geometry of the first emergent surface are coordinated so as to homogenize and optimize the color mixture.

According to one embodiment, the elementary pattern has an axial symmetry. Thus, thanks to this arrangement, the beams of light rays are mixed so as to obtain a homogenous color.

According to one embodiment, the elementary pattern has a planar symmetry. Thus, thanks to this arrangement, the beams of light rays are mixed so as to obtain a homogenous color.

According to one embodiment, the elementary pattern has a rotational symmetry. Thus, thanks to this arrangement, the beams of light rays are mixed so as to obtain a homogenous color.

According to one embodiment, the second network of elementary patterns comprises a set of crowns. Thus, the second network of elementary patterns has the same distribution as the light beam that emerges from the optical system.

According to one embodiment, the set of crowns comprises concentric circles. Thus, the set of crowns has the same distribution as the light beam that emerges from the optical system.

According to one embodiment, each crown of the set of crowns comprises elementary patterns equidistant from each other and equidistant with respect to at least one of the singular points among the first distal singular point and the second distal singular point. Thus, thanks to this arrangement, the color mixture is homogenous.

According to one embodiment, a crown is configured to form a level. Thus, thanks to this arrangement, the elementary patterns forming the crown are distributed at the same height.

According to one embodiment, the set of crowns is configured to form a set of levels where the orthogonal projection of each level is equidistant therebetween. Thus, thanks to this arrangement, the geometry of the set of crowns and the geometry of the second emergent surface are coordinated so as to homogenize and optimize the color mixture.

According to one embodiment, the first three-dimensional texture has a first network of evenly distributed elementary patterns. Thus, thanks to this arrangement, the beams of light rays are mixed so as to obtain a homogenous color.

According to one embodiment, the first three-dimensional texture has substantially even elementary patterns. Thus, thanks to this arrangement, the geometry of the elementary patterns and the geometry of the first emergent surface are coordinated so as to homogenize and optimize the color mixture.

According to one embodiment, the elementary pattern comprises a profile defined by an elementary polynomial function. Thus, thanks to this arrangement, the profile of the elementary pattern allows homogenizing the beam of light rays emerging from the elementary pattern.

According to one embodiment, the elementary polynomial function is defined over a finite interval. Thus, thanks to this arrangement, the profile comprises a defined and finite shape.

According to one embodiment, the elementary polynomial function is continuously tangent to the curve of the first emergent surface. In other words, the polynomial function has a set of equal first derivatives at the junction points between the polynomial function and the curve of the first emergent surface. In other words, the polynomial function is C1 continuous. Thus, thanks to this arrangement, the elementary pattern comprises no sharp angle with the first emergent surface.

According to one embodiment, the elementary polynomial function has an axis of symmetry. Thus, thanks to this arrangement, the profile is homogenous.

According to one embodiment, the elementary pattern comprises a profile defined by a Spline function. Thus, thanks to this arrangement, the profile comprises a defined and finite shape.

According to one embodiment, the Spline function is continuously tangent to the curve of the first emergent surface. In other words, the Spline function has a set of equal first derivatives at the junction points between the Spline function and the curve of the first emergent surface. In other words, the Spline function is C1 continuous.

According to one embodiment, the profile of the elementary pattern is repeated by translation according to a first primary vector of the primary reference frame. Thus, thanks to this arrangement, the elementary pattern is homogenously distributed.

According to one embodiment, the elementary polynomial function is repeated by translation according to the first primary vector. Thus, thanks to this arrangement, the elementary pattern is homogenously distributed.

According to one embodiment, the elementary pattern is periodically repeated in the direction of the first primary vector. Thus, thanks to this arrangement, the elementary pattern is homogenously distributed.

According to one embodiment, the profile of the elementary pattern is repeated by translation according to a second primary vector of the primary reference frame. Thus, thanks to this arrangement, the elementary pattern is homogenously distributed.

According to one embodiment, the elementary polynomial function is repeated by translation according to the second primary vector. Thus, thanks to this arrangement, the elementary pattern is homogenously distributed.

According to one embodiment, the elementary pattern is periodically repeated in the direction of the second primary vector. Thus, thanks to this arrangement, the elementary pattern is homogenously distributed.

According to one embodiment, the profile of the elementary pattern is repeated by translation according to a third primary vector of the primary reference frame. Thus, thanks to this arrangement, the elementary pattern is homogenously distributed.

According to one embodiment, the elementary polynomial function is repeated by translation according to the third primary vector. Thus, thanks to this arrangement, the elementary pattern is homogenously distributed.

According to one embodiment, the elementary pattern is periodically repeated in the direction of the third primary vector. Thus, thanks to this arrangement, the elementary pattern is homogenously distributed.

According to one embodiment, the first primary vector, the second primary vector and the third primary vector of the primary reference frame intersect at an intersection point. Thus, thanks to this arrangement, the three vectors comprise a same origin.

According to one embodiment, the elementary pattern defined according to the first primary vector and the elementary pattern defined according to the second primary vector are configured to provide a first textured surface. Thus, thanks to this arrangement, the first textured surface is even.

According to one embodiment, the elementary pattern defined according to the first primary vector and the elementary pattern defined according to the third primary vector are configured to provide a textured surface. Thus, thanks to this arrangement, the first textured surface is even.

According to one embodiment, the elementary pattern defined according to the third primary vector and the elementary pattern defined according to the second primary vector are configured to provide a first textured surface. Thus, thanks to this arrangement, the first textured surface is even.

According to one embodiment, the first primary vector and the second primary vector intersect by forming an angle comprised between 45° and 75°, in particular between 50° and 70° and in particular between 55° and 65°. Thus, thanks to this arrangement, the first network of elementary patterns comprises meshes in the form of lozenges.

According to one embodiment, the third primary vector and the second primary vector intersect by forming an angle comprised between 45° and 75°, in particular between 50° and 70° and in particular between 55° and 65°. Thus, thanks to this arrangement, the first network of elementary patterns comprises meshes in the form of lozenges.

According to one embodiment, the first primary vector and the third primary vector intersect by forming an angle comprised between 100° and 140°, in particular between 110° and 13° and in particular between 115° and 125°. Thus, thanks to this arrangement, the first network of elementary patterns comprises meshes in the form of lozenges.

According to one embodiment, the second three-dimensional texture has a second network of elementary patterns. Thus, thanks to this arrangement, the color mixture is homogenous.

According to one embodiment, the second network of elementary patterns is configured to be dependent on the curvature of the second emergent surface. Thus, thanks to this arrangement, the geometry of the second network of elementary patterns and the geometry of the second emergent surface are coordinated so as to homogenize and optimize the color mixture.

According to one embodiment, the second network of elementary patterns comprises a plurality of spirals portions. Thus, the second network of elementary patterns conforms better to the shape of the projected light beam.

According to one embodiment, each spiral portion comprises elementary patterns. Thus, thanks to this arrangement, the elementary patterns are evenly distributed on the second emergent surface.

According to one embodiment, each spiral portion comprises a center located on the second distal singular point. Thus, thanks to this arrangement, the plurality of spirals portions completely or partially covers the second emergent surface.

According to one embodiment, each spiral portion comprises a center located on a common boundary. Thus, thanks to this arrangement, the plurality of spirals portions completely or partially covers the second emergent surface.

According to one embodiment, each portion comprises a center located on the distal singular line. Thus, thanks to this arrangement, the plurality of spirals portions completely or partially covers the second emergent surface.

According to one embodiment, each spiral portion comprises a center located on the common distal singular line. Thus, thanks to this arrangement, the plurality of spirals portions completely or partially covers the second emergent surface.

According to one embodiment, the second three-dimensional texture has a second network of evenly distributed elementary patterns. Thus, thanks to this arrangement, each beam of light rays is mixed so as to obtain a homogenous color.

According to one embodiment, the elementary polynomial function is continuously tangent to the curve of the second emergent surface. In other words, the polynomial function has a set of equal first derivative at the junction points between the polynomial function and the curve of the second emergent surface. In other words, the polynomial function is C1 continuous. Thus, thanks to this arrangement, the elementary pattern comprises no sharp angle with the second emergent surface.

According to one embodiment, the Spline function is continuously tangent to the curve of the second emergent surface. In other words, the Spline function has a set of equal first derivatives at the junction points between the Spline function and the curve of the second emergent surface. In other words, the Spline function is C1 continuous.

According to one embodiment, the profile of the elementary pattern is repeated by translation according to a first secondary vector of the secondary reference frame. Thus, thanks to this arrangement, the elementary pattern is homogenously distributed.

According to one embodiment, the elementary polynomial function is repeated by translation according to the first secondary vector. Thus, thanks to this arrangement, the elementary pattern is homogenously distributed.

According to one embodiment, the elementary pattern is periodically repeated periodically in the direction of the first secondary vector. Thus, thanks to this arrangement, the elementary pattern is homogenously distributed.

According to one embodiment, the elementary pattern varies at least one of the parameters among the length, the width and the height according to the distance of the first secondary vector with respect to the first emergent surface. Thus, thanks to this arrangement, the shape of the elementary pattern depends on its distance with respect to the first emergent surface.

According to one embodiment, the elementary pattern varies at least one of the parameters among the length, the width and the height through a cylindrical symmetry. Thus, thanks to this arrangement, the shape of the elementary pattern depends on its distance with respect to the first emergent surface.

According to one embodiment, the elementary pattern varies at least one of the parameters among the length, the width and the height through a cylindrical symmetry with a reflection of the second emergent surface perpendicularly to the main optical axis. Thus, thanks to this arrangement, the shape of the elementary pattern depends on its distance with respect to the main optical axis.

According to one embodiment, the second emergent surface is configured to comprise a transformation of the elementary pattern by a homothety whose center is the main optical axis. Thus, thanks to this arrangement, the shape of the elementary pattern depends on its distance with respect to the main optical axis.

The present invention further concerns a luminous device for aligning a set of beams of light rays relative to a projection axis and comprising at least one light source and at least one optical system according to the invention.

According to one embodiment, each light source comprises at least two and preferably four light rays emitting surfaces, preferably with a different color per emitting surface, each emitting surface being preferably offset with respect to the main optical axis of the optical system associated thereto.

According to one embodiment, the projection axis comprises an angle comprised between 0° and 10°, in particular between 0° and 5° and preferably between 0° and 3° with the main optical axis of the optical system.

According to one embodiment, the projection axis may be coincident with the main optical axis of the optical system.

According to one embodiment, the luminous device comprises a plurality of optical systems according to the invention.

According to one embodiment, the luminous device further comprises a substrate.

According to one embodiment, the luminous device further comprises a printed circuit. Thus, thanks to this arrangement, electronic components may be assembled.

According to one embodiment, the printed circuit comprises a plurality of light sources, each light source being disposed at the object focus of an optical system of the matrix. Thus, thanks to this arrangement, the light sources may be assembled with other electronic components.

According to one embodiment, each light source is a light-emitting diode. Thus, thanks to this arrangement, the intensity of the light source may be graduated by making the duty-cycle of the current and/or voltage source vary.

According to one embodiment, the light-emitting diode emits a monochromatic wavelength range.

According to one embodiment, all light-emitting diodes are configured to emit a monochromatic light.

Other features and advantages of the invention will appear better on reading the following description of an embodiment of the invention provided as a non-limiting example.

BRIEF DESCRIPTION OF THE DRAWINGS

The invention will be better understood from the detailed description, which is disclosed below with reference to the drawings, in which.

In the following detailed description of the figures defined hereinabove, the same elements or the elements filling identical functions may keep the same references so as to simplify the understanding of the invention.

DETAILED DESCRIPTION

Figure 1:
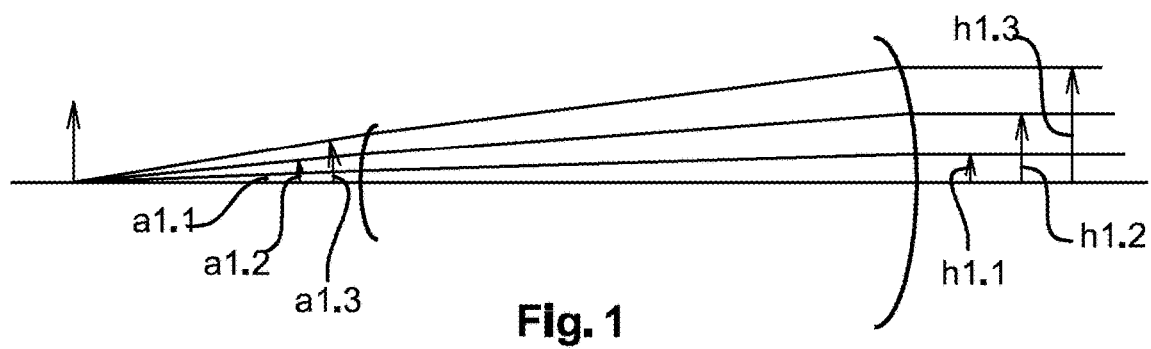
FIG. 1 represents a collimator according to the related art.

By optical system 100, is meant in the present application a transparent part inside which light rays propagate in a controlled manner from one of the ends of the optical system 100, called incident surface up to an emergent surface. The light rays penetrate into the optical system 100 via an incident diopter 126 and propagate possibly by internal reflections on a lateral surface 510, and leave the optical system 100 by an emergent diopter 147. In practice, a luminous object 900, for example small-sized, such as a light-emitting diode or a COB system («Chip-On-Board»), is disposed in the proximity of the incident surface. When the luminous object 900 is a light source 901, the light rays emitted by this light source 901 propagate in the optical system 100 from an incident surface toward an emergent surface and possibly via lateral surfaces located between the incident surface and the emergent surface.

The general principle of the invention lies on an optical system 100 made of a material transparent to wavelengths comprised in a set of beams of light rays and intended to align the set of beams of light rays relative to a main optical axis O-O from a luminous source having a plurality of light sources 901, such as for example an RGBW LED, in order to obtain an iridescence-free additive synthesis of the color mixture, without any clear projection of the image of the chip and without any dark spot at the center of the beam.

In some cases, in particular when the light source is white or polychromatic, such as for example an electric bulb, the iridescence phenomenon may appear and is due to the lateral chromatic aberration of the conventional optical system. In order to overcome this defect, there are solutions such as for example the use of flint glass in combination with a crown glass. However, the invention described hereinafter treats the iridescence problem, which may appear during the additive synthesis and not the lateral chromatic aberration.

Indeed, the conventional optical systems, intended for projectors in particular, may be assimilated to aplanatic systems, at least as regards the areas operating in transmission. Consequently, associated to an RGBW LED, they project a substantially clear image of the light source composed of four chips with different colors. Under these conditions, the colors of the chips of the LED cannot be properly mixed.

This is due to the fact that the light rays coming from the object focus of a conventional optical system are sorted out so as to generate a beam of parallel rays. For small opening angles, the value of the sine of the angle, for example a1.1, a1.2 and a1.3, represented in FIG. 1, is approximately equal to the value of the angle itself. In addition, the emergence distance of an optical ray with respect to the main optical axis O-O, for example h1.1, h1.2 and h1.3, is proportional to the incidence angle of the incident light ray at the incident surface. FIG. 1 illustrates this example: a1.1∝h1.1, a1.2∝h1.2 and a1.3∝h1.3. Moreover, for small opening angles, the aplanatic condition also indicates that the emergence distance of an optical ray with respect to the main optical axis O-O is also proportional to the incidence angle of the incident light ray at the incident surface. This last statement clearly implies that the aplanatic condition is met for a conventional optical system and thus allows obtaining a clear image: This is Gauss's approximation. Henceforth, a conventional optical system as defined before will project a substantially clear image of a light source, since Gauss's approximation will be substantially met.

The Applicant proposes an optical system 100 configured so that the relationship between the approximation of the incidence angle and the emergence distance of the emergent optical ray with respect to the main optical axis O-O is proportionally descendant so as not to project a clear image of the light source, which results in mixing the colors of the different chips of the LED, as well as a textured emergent surface for uniformizing the homogenization of the additive synthesis. Under these conditions, Gauss's approximation is not met and the relationship between the incidence angle and the distance of the emergent ray is not ascendant. Consequently, the image of the light source 901 is uniformly homogenous and dissociated from its shape.

Thus, the invention improves the additive synthesis by uniformizing the homogenization of the color mixture at the emergent surface and by dissociating the light source 901.

Referring to FIGS. 2 to 5, there may be observed the projection of the image of an object performed by an optical system according to the invention.

Figure 3:
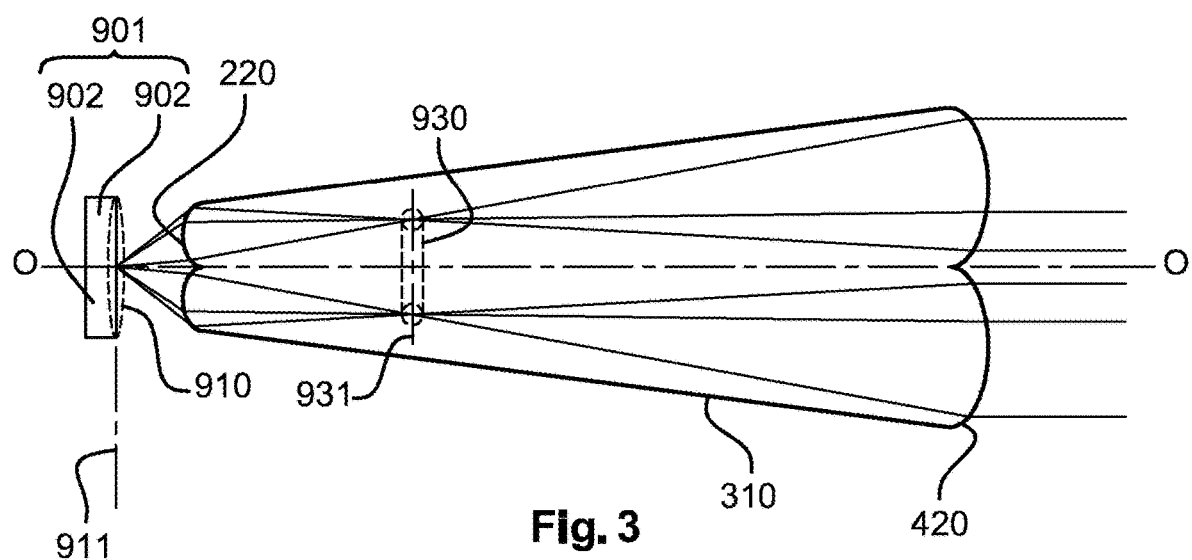
FIG. 3 illustrates an example of an optical system according to an embodiment.
Figure 4:
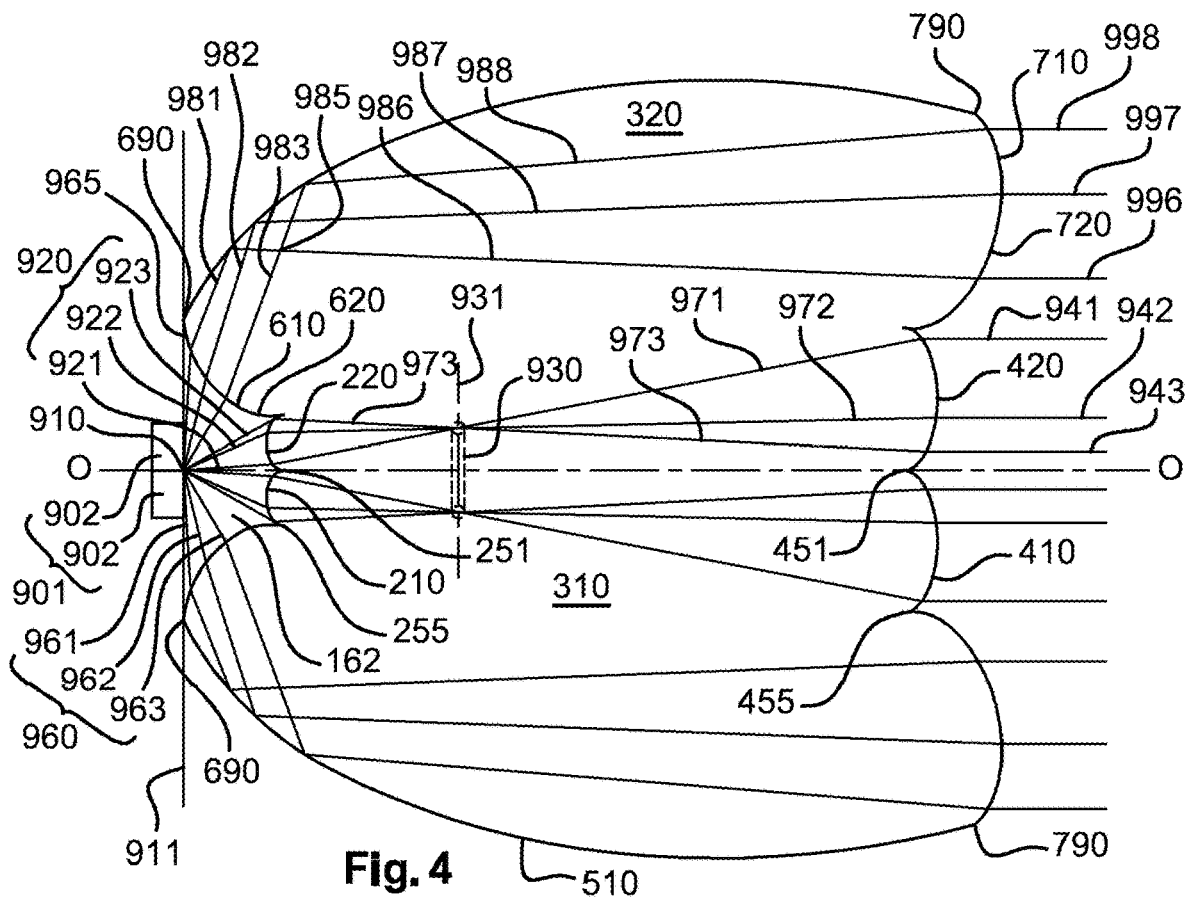
FIG. 4 presents an example of an optical path in the optical system according to an embodiment.
Figure 5:
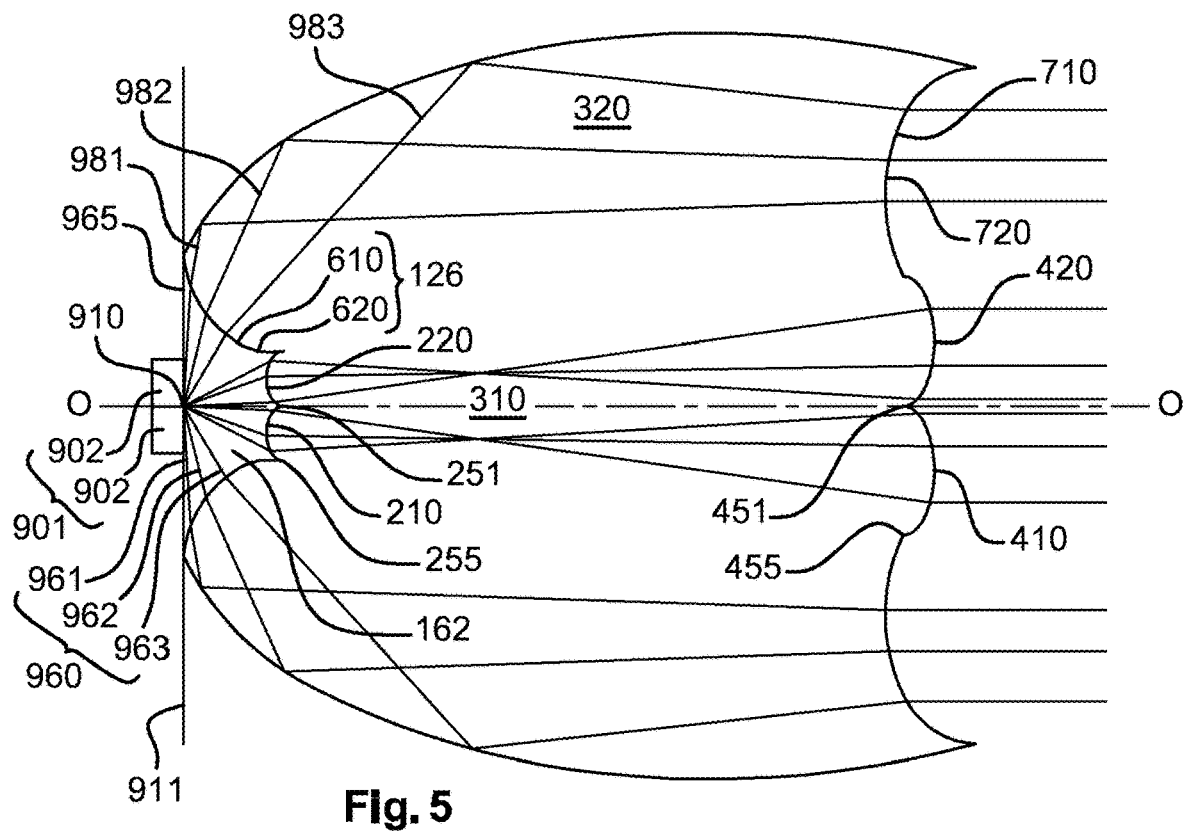
FIG. 5 discloses an example of an optical path in the optical system according an embodiment.

As shown in FIGS. 3, 4 and 5, the optical system comprises a set of light sources which emits composite beams of incident light rays in the direction of an optical system 100 which embeds the spirit of the invention.

Thus, the light projector can re-project the light beam coming from this light source in front of which a screen may be placed.

The light source 901 defines a main optical axis O-O. This optical system 100, preferably integrally made of polymer and more exactly of silicon or Poly(methyl methacrylate) known better by the name PMMA, comprises a central body 310 and a peripheral body 320. The central body 310 and the peripheral body 320 are integrally made.

This arrangement has a few advantages such as, for example, resisting a high density of blue light (between 2 W/cm² and 10 W/cm²) but also enabling the formation of a complex shape like that of the optical system 100 described hereinafter.

Figure 2:
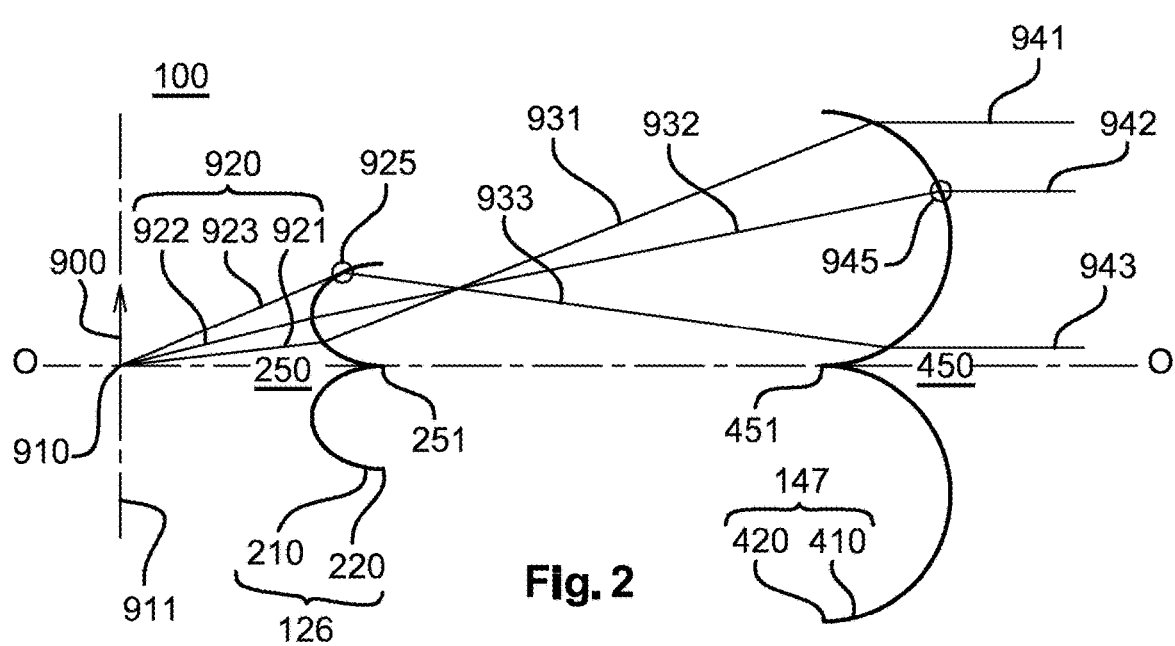
FIG. 2 shows an example of an optical path in the optical system.

FIG. 2 represents the optical system 100 as well as the optical paths of light rays in order to facilitate the understanding of the invention. In this example, is represented a luminous object 900 or more specifically a light source 901.

This light source 901 comprises an emission axis (not represented) and at least one emitting surface 902, also called emitting element of light rays intended to be emitted in a space with a refractive index greater than or equal to one. The emitted light rays are distributed into two categories of beams: a composite central beam 920 and a composite lateral beam 960 (not represented in FIG. 2). The emission axis of the light source 901 lies substantially at the center of the emitting surface 902 of the light source 901 and is normal to the emitting surface 902.

The light source 901 is placed in the main object focus area 910 or more exactly the emitting surface 902 is placed on the main object focal plane 911. The optical system 100 comprises, as mentioned before, an incident diopter 126 and an emergent diopter 147. The incident diopter 126 is intended to refract the light rays emitted by the light source 901 toward the emergent diopter 147. More specifically, the light rays coming from the light source 901 placed in the main object focus area 910, or more rigorously in the main object focal plane 911, and incident to the incident diopter 126 are refracted toward the emergent diopter 147. The latter, that is to say the emergent diopter 147, is configured to refract the light rays coming from the incident diopter 126 toward a screen or to infinity. The incident diopter 126 and the emergent diopter 147 are crossed by a main optical axis O-O.

In this example illustrated in FIG. 2, the light rays of the composite central beam 920 are distributed into three subcategories: the near-incident light rays 921 that is to say whose incidence area 925 is close to the main optical axis O-O, the extreme-incident light rays 923 in other words the light rays whose incidence area 925 is the furthest from one of the ends of the incident diopter 126 and the central-incident light rays 922, in other words the light rays whose incidence region is located between the near-incident light rays 921 and the extreme-incident light rays 923.

The incident diopter 126, described before, comprises a first incident surface 210 which defines a first incident optical element 220. The first incident surface 210 comprises a proximal cavity 250. The latter, that is to say the proximal cavity 250, is formed by a first proximal singular point 251 in the first incident optical element 220. Considering a somehow imaginative example of this configuration, this proximal cavity 250 is similar to a cavity located on the lower portion of an apple: the eye's cavity. In other words, the proximal cavity 250 associated to the first incident surface 210 have a hemi-toroidal shape, more exactly the first incident surface 210 has a zero-collar half-torus shape. Indeed, the first incident optical element 220 has a zero-collar half-torus shape.

The emergent diopter 147, mentioned before, comprises a first emergent surface 410 which defines a first emergent optical element 420. The first emergent surface 410 comprises a distal cavity 450. The latter, that is to say the distal cavity 450, is formed by a first distal singular point 451 in the first emergent optical element 420. Considering a somehow imaginative example of this configuration, this distal cavity 450 is similar to a cavity located on the upper portion of an apple: the stem's cavity. In other words, the distal cavity 450 associated to the first emergent surface 410 have a hemi-toroidal shape, more exactly the first emergent surface 410 has a zero-collar half-torus shape. Indeed, the first emergent optical element 450 has a zero-collar half-torus shape.

Of course, the first distal singular point 451 is a singular point away from the light source 901 since it is comprised in the emergent diopter 147. On the contrary, the first proximal singular point 251 is located on the incident diopter 126, that is to say that diopter which is firstly crossed by the light rays in other words it is a singular point which is close to the light source 901.

As can be observed in FIG. 2, the distal cavity 450 and the proximal cavity 250 are located on the main optical axis O-O. Indeed, the first distal singular point 451 and the first proximal singular point 251 form part of the main optical axis O-O.

Also shown in FIG. 3, the first incident optical element 220 may have a curvilinear shape, more specifically a convex shape. More exactly, the first incident optical element 220 may have a shape of a convex optical element configured to enable the incident rays to be refracted toward an intermediate focus area 930.

The first emergent optical element 420 may also have a curvilinear shape, more specifically a convex shape. More exactly, the first emergent optical element 420 may have a shape of a convex optical element configured to enable the rays coming from the intermediate focus area 930 to emerge at an angle comprised between 0° and 10°, in particular between 0° and 5° and preferably between 0° and 3° with respect to the main optical axis O-O.

Indeed, in this embodiment, the first incident optical element 220 and the first emergent optical element 420 may define the intermediate focus area 930. This intermediate focus area 930 may extend all around the main optical axis O-O and between the first emergent optical element 420 and the first incident optical element 220, more specifically the intermediate focus area 930 is placed between the first emergent surface 410 and the first incident surface 210. More rigorously, the first emergent optical element 420 comprises an intermediate focal plane 931. The latter, that is to say the intermediate focal plane 931 may form an angle comprised between 80° and 90°, in particular between 85° and 90° and preferably between 87° and 90° with the main optical axis O-O. Thus, thanks to this configuration, every intermediate image formed by the first incident optical element 220 of the light source 901 lies at the level of the intermediate focal plane 931 of the first emergent optical element 420. In other words, the intermediate image of the first incident optical element 220 is located in the intermediate focus area 930 of the optical system 100 so as to form the final image of the light source 901 to infinity.

Thus, the configuration of the first emergent optical element 420 and of the first incident optical element 220 enable the constitution of a main object focus area 910 between the first incident optical element 220 and the emitting surface 902 of the light source 901 and the intermediate focus area 930 located between the first emergent optical element 420 and the first incident optical element 220 in the optical system 100. In some cases, the main object focus area 910 may be coincident with the emitting surface 902 of the light source 901. This configuration allows reversing the light rays of the composite central beam 920. In this manner, when a light source 901 is placed on the main object focus area 910 or more rigorously in the main object focal plane 911, all the rays belonging to the composite central beam 920 of the light source 901 and incident to the first incident surface 210 are refracted toward the first emergent optical element 420 so as to emerge parallel to the main optical axis O-O. Henceforth, the image of the light source 901 is reversed that is to say that the image of the light source 901 undergoes, at the passage of the first incident optical element 220, a central symmetry whose center is the intermediate focus area 930. According to one embodiment, the central symmetry may be substituted with a homothety having a negative ratio.

FIG. 4 represents the optical course of the light rays composing the composite central beam 920 and the composite lateral beam 960. Referring to FIG. 2, the optical path of the composite central beam 920, is described hereinafter in order to enable a better understanding of the latter.

The light source 901 is placed, as described before, opposite the optical system 100. The first incident optical element 220 is configured to refract the light rays coming from the light source 901 toward the first emergent optical element 420. More exactly, the first incident surface 210 is configured so that the light rays belonging to the composite central beam 920 and whose emission angle is close to the main optical axis O-O, that is to say the near-incident light rays 921, intersect the extreme-incident light rays 923 whose emission angle is close to the end of the first incident surface 210 at an intersection point located in the intermediate focus area 930 and in the proximity of or in the intermediate focal plane 931 and between the first incident surface 210 and the first emergent surface 410. More exactly, the near-incident light rays 921 incident to the first incident surface 210 are refracted toward the intermediate focus area 930 in the same manner as the extreme-incident light rays 923 and the central-incident light rays 922. Once the incident diopter 126 is crossed, the near-incident light rays 921 are called near-refracted light rays 971, the extreme-incident light rays 923 are called extreme-refracted light rays 973 and the central-incident light rays 922 are called central-refracted light rays 972. These latter ones actually intersect at an intersection point located in the intermediate focus area 930 and in the proximity of or in the intermediate focal plane 931. These rays, that is to say the near-refracted light rays 971, the extreme-refracted light rays 973 and the central-refracted light rays 972 propagate in the central body 310 toward the first emergent surface 410 in order to emerge from the optical system 100 into near-emergent light rays 941, extreme-emergent light rays 943 and central-emergent light rays 942 respectively.

In other words, the optical system is configured so that the farther the emission angle of a light ray of the composite central beam 920 is from the main optical axis O-O, the closer the respective emergent light ray is to the main optical axis O-O. On the contrary, the optical system is configured so that the closer the emission angle of the composite central beam 920 coming from the light source is to the main optical axis O-O, the farther the respective emergent light ray is from the main optical axis O-O. In other words, the distance comprised between the emergent light ray coming from a near-incident light ray 921 and the main optical axis O-O, that is to say between the near-emergent light rays 941 and the main optical axis O-O, is larger than the distance comprised between the emergent light ray coming from an extreme-incident light ray 923 and the main optical axis O-O, that is to say between the extreme-emergent light rays 943 and the main optical axis O-O.

In other words, the optical system 100 is configured so that the distance of an emergent light ray with respect to the main optical axis O-O decreases according to the increase of the emission angle of the respective light ray coming from the light source 901, and conversely the distance of an emergent light ray with respect to the main optical axis O-O increases according to the decrease of the emission angle of the respective light ray coming from the light source 901.

In order to obtain this reversal of the composite central beam 920, the calculation of the first surfaces consists in putting into equations the first incident surface 210 of the first incident optical element 220 and the first emergent surface 410 of the first emergent optical element 420 with as a constraint the focalization of the emergent light rays and of the light rays focused in the intermediate focus area 930. The set of equations thus obtained is coupled and provides as a result the shape of the first incident optical element 220 with a proximal cavity 250 and the shape of the first emergent optical element 420 with a distal cavity 450. The shape of the main body of the optical system 100, represented in FIGS. 4, 5, 15 and 16 has an external aspect similar to the shape of a half-sphere, more specifically, the shape of the main body of the optical system 100 is similar to the shape of a truncated half-circle, when the optical system 100 is viewed in profile, since the apex of the half-circle may be truncated in order to form a setup plane 952 with a peripheral seat 951 comprised in and/or on the setup plane 952 and on which the optical system 100 can rest, when the latter is set in place.

For clarity, the description of the overall geometric shape of the optical system 100, has been simplified and reduced to a sphere. According to some embodiments, the optical system 100 may have a semi-oval, semi-parabolic and/or semi-elliptical shape depending on the characteristics of the light source 901, the dimensions of the optical system 100, and/or the refractive index of the material used to form said optical system 100.

The optical system 100 further comprises a second incident surface 610, a lateral surface 510 and a second emergent surface 710.

As shown in sectional view in FIGS. 4 and 5, the optical system 100 comprises a cavity 162 located between the main focal plane 911 and the incident diopter 126 comprising a first incident surface 210 and the second incident surface 610. The first incident surface 210 and the second incident surface 610 respectively form the vault of the cavity 162 and the lateral wall of the cavity 162. This cavity 162 is configured to receive the composite central beam 920 and the composite lateral beam 960 of the light source 901 via an opening 965 enabling access to this cavity 162. As mentioned before, the optical system 100 is orientated relative to the light source 901 so that the incident beams reach the optical system 100, at the level of its incident surface at an angle with respect to the optical axis of the light source 901. The surface set forming the incident diopter 126 completely or partially covers the cavity 162 and may be substantially planar or have a convex shape depending on the embodiments.

The outer periphery of the optical system 100 represented in FIG. 4, comprises an upper peripheral border 790 having a substantially linear, circular, annular, rectangular or polygonal shape, and extends in a plane substantially perpendicular to the main optical axis O-O of the optical system 100. This upper peripheral border 790 may be formed by a second emergent surface 710.

The outer periphery of the optical system 100 also comprises a lower peripheral border 690 having a substantially linear, circular, annular, rectangular or polygonal shape, and extends in a plane substantially perpendicular to the main optical axis O-O of the optical system 100. This lower peripheral border 690 may be formed by a second incident surface 610. Depending on the embodiments, this lower peripheral border 690 may completely or partially form the opening 965 enabling access to this cavity 162. A support (not represented) may be formed on the lower peripheral border 690 between the lower peripheral border 690 and the setup plane 952. The support is intended to support the optical system 100.

FIGS. 4 and 5 represent the course of a set of light rays emitted by the light source 901 within the optical system 100, in order to enable a better understanding of the latter. In the following general description, only the course of the set of light rays of the composite lateral beam 960 will be described.

Figure 6:
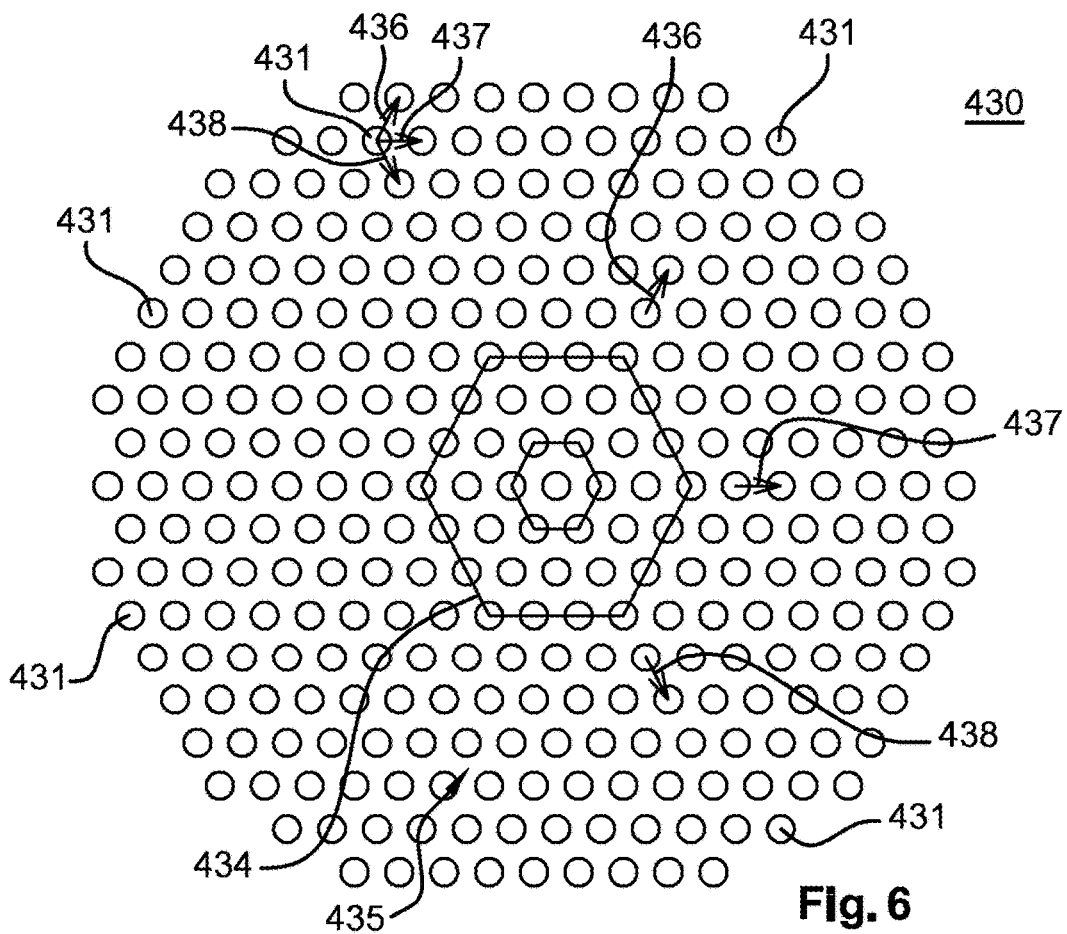
FIG. 6 shows a first three-dimensional texture according to an embodiment.
Figure 7:
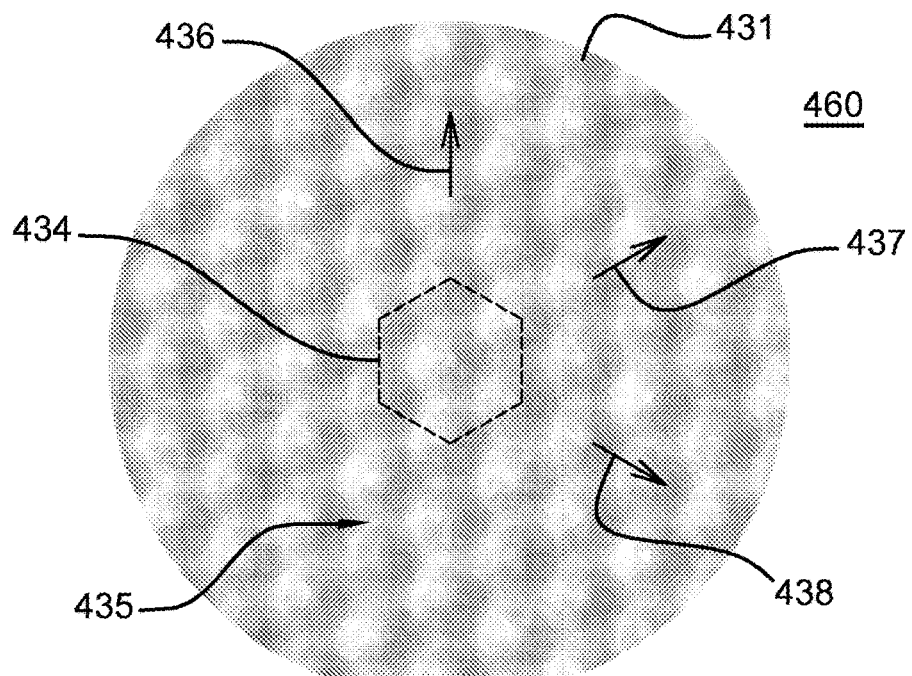
FIG. 7 illustrates a first textured surface according to an embodiment.
Figure 15:
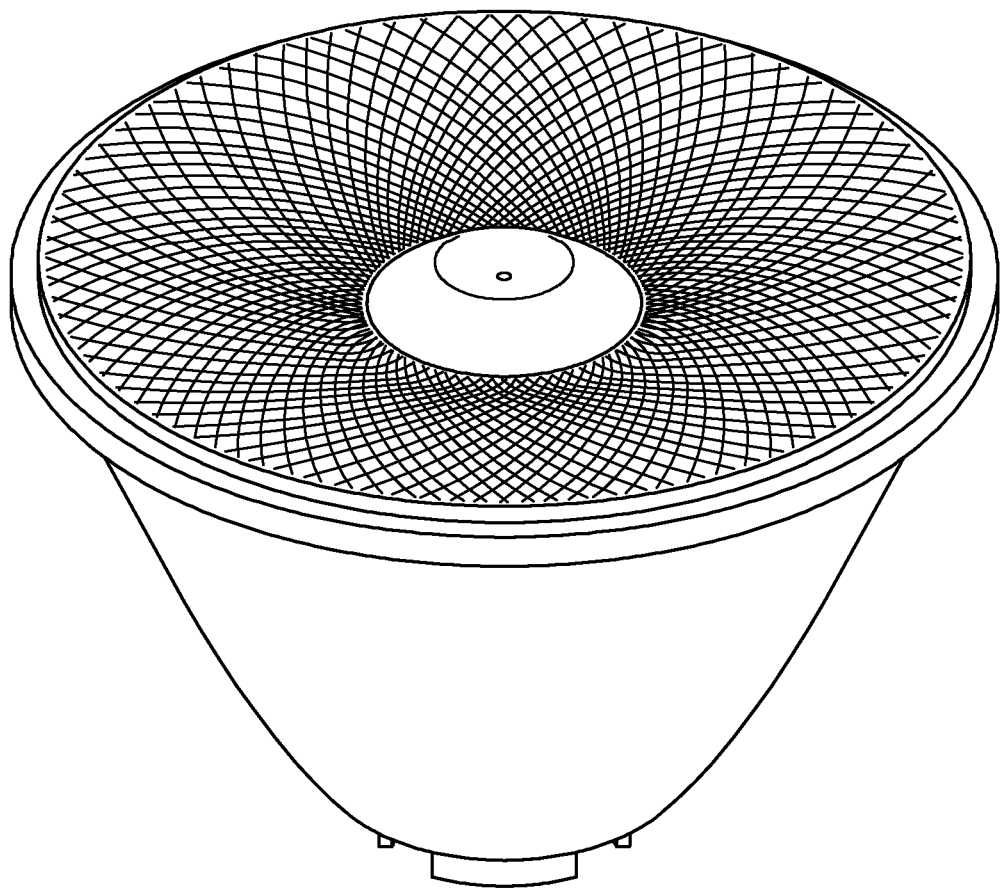
FIG. 15 represents a perspective view of the optical system according to an embodiment.

The light source 901, as mentioned before, is completely or partially admitted into the optical system 100, via a passage 953, represented in FIG. 15, comprised in the setup plane 952 and enabling access to a housing formed inside the optical system 100. This housing extends the cavity 162. The housing is formed by a support intended to support the optical system 100. The first incident surface 210 is delimited by the second incident surface 610 and forms the cavity 162 as described before. In the transitory region, or expressed another way at the interface between the housing and the cavity, is located the main object focus area 910, or more specifically the main focal plane 911. This boundary, formed by the first incident surface 210 and the second incident surface 610, is, in FIGS. 4 and 6, in the form of a second proximal cavity 650 delimiting a proximal intersection area 252 between the first incident surface 210 and the second incident surface 610. This proximal intersection area 252 is formed by a common first proximal singular point 251 and more particularly in the form of a first proximal cusp point 255. In practice, this boundary, that is to say this proximal intersection area 252, may be in the form of a common first proximal singular line and more particularly in the form of a first proximal cusp line.

More exactly, the first proximal singular point 251 is a first proximal cusp point, more specifically a first first-order proximal cusp point partially formed by the convex shape of the second incident surface.

More rigorously, the first proximal singular line is a first cusp line, more specifically a first first-order proximal cusp line partially formed by the convex shape of the second incident surface.

The incident composite lateral beam 960, that is to say the light ray's incident to the second incident surface, are refracted toward the lateral surface 510 of the optical system 100, or more exactly toward the peripheral emergent surface: the second emergent surface 710. Indeed, the lateral surface 510 and one of the ends of the second emergent surface are coincident in order to form the upper peripheral border 790.

Thus, the second emergent surface 710 receives via the lateral surface 510, the composite lateral beam 960 incident to the second incident surface.

The rays reflected by the lateral surface 510 emerge from the second emergent surface 710 at an angle comprised between 0° and 10°, in particular between 0° and 5° and preferably between 0° and 3° with respect to the main optical axis O-O thanks to a second optical element 720 having a curvilinear shape, more specifically a convex shape defining the second emergent surface 710.

The convex shape of the second emergent surface 710 comprises a second distal cavity allowing delimiting a distal intersection area between the second emergent surface 710 and the first emergent surface 410. This distal intersection area is common to the second emergent surface 710 and to the first emergent surface 410 and is in the form of a second distal singular point 455. In other words, the second emergent surface and the first emergent surface 410 comprise a common second distal singular point 455. In practice, this boundary, that is to say the common second distal singular point 455 may be in the form of a second distal singular line 453 common to the second emergent surface and to the first emergent surface 410, in other words the second emergent surface and the first emergent surface 410 comprise a common second distal singular line 453.

More exactly, the second distal singular point 455 is a second distal cusp point, more specifically a second first-order distal cusp point partially formed by the convex shape of the second emergent surface.

More rigorously, the second distal singular line 453 is a second distal cusp line, more specifically a second first-order distal cusp line partially formed by the convex shape of the second emergent surface 610.

According to another embodiment, the second emergent surface 610 may have a concave shape. Henceforth, the second distal cusp point is a second second-order distal cusp point partially formed by the concave shape of the second emergent surface 610. More rigorously, the second distal cusp line is a second second-order distal cusp line partially formed by the concave shape of the second emergent surface.

The inner wall of the cavity 162 is configured to orientate, by total internal reflection, the incident composite lateral beam 960 coming from the second incident surface 610 toward the second emergent surface 710. More exactly, the lateral surface 510 is configured so that the incident grazing light rays 961, that is to say the light rays whose emission angle is close to the setup plane 952, intersect the incident intermediate light rays 963, that is to say the light rays whose emission angle is close to the end of the first incident surface 210, and at the same time adjacent the composite central beam 920 at a peripheral intersection point 985 located between the ends of the second incident surface and the ends of the lateral surface 510 with reference to the optical path of the light rays.

More exactly, the incident grazing light rays 961 incident to the second incident surface 610 are refracted toward the lateral surface 510 in the same manner as the incident intermediate light rays 963. Once the incident diopter 126 is crossed, the incident grazing light rays 961 are called refracted grazing light rays 981, the incident intermediate light rays 963 are called refracted intermediate light rays 983. Afterwards, the refracted grazing light rays 981 are reflected toward the second emergent surface 710 and again they are called reflected grazing light rays 986. Indeed, the reflected grazing light rays 986 actually intersect at the peripheral intersection point 985 the refracted intermediate light rays 983 located between the lateral surface 510 and the second incident surface 610, before emerging through the second incident surface 710 thereby becoming emergent grazing light rays 996.

The same applies to the incident medial light rays 962: they are first refracted by the second incident surface 610 and afterwards the refracted medial light rays 982 are reflected by the lateral surface 510 to become reflected medial light rays 987 before emerging through the second emergent surface 710 into emergent medial light rays 997.

Similarly, those skilled in the art will understand that the references 983, 988 and 998 describe the incident intermediate light rays 962 at different steps of the course between the second incident surface 210 and the second emergent surface 610 throughout the lateral surface 510.

In other words, the optical system 100 is configured so that the farther the emission angle of an incident intermediate light ray 963 coming from the light source 901 is from the main focal plane 911, the farther the respective emergent light ray is from the main optical axis O-O. On the contrary, the optical system 100 is configured so that the closer the emission angle of a grazing light ray coming from the light source 901 is to the main focal plane 911, the closer the respective emergent light ray is to the main optical axis O-O. In other words, the distance comprised between the emergent grazing light ray 996 coming from an incident grazing light ray 961 and the main optical axis O-O is shorter than the distance comprised between the emergent intermediate light ray 998 coming from an incident intermediate light ray 963 and the main optical axis O-O and respectively the emission angle of an incident grazing light ray 961 is larger than the emission angle of an incident intermediate light ray 963.

In other words, the second emergent surface is configured so that the distance of an emergent light ray with respect to the main optical axis O-O decreases according to the increase of the emission angle of the respective light ray coming from the light source 901, and conversely the distance of an emergent light ray with respect to the main optical axis O-O increases according to the decrease of the emission angle of the respective light ray coming from the light source 901.

According to another embodiment, FIG. 5, the second emergent optical element 720 may have a curvilinear shape, more specifically a convex shape. More exactly, the second emergent optical element 720 may be in the form of a convex optical element configured to enable the emergent rays to emerge at an angle comprised between 0° and 10°, in particular between 0° and 5° and preferably between 0° and 3° with respect to the main optical axis O-O.

Thus, thanks to this arrangement, the second incident optical element 620 and the second emergent optical element 720 form a biconvex aspheric optical element enabling the optical system 100 to properly focus the light ray's incident to the second incident surface.

The parameters which are the radius of curvature of the curvilinear shape of the second incident optical element 620, the radius of curvature of the curvilinear shape of the lateral surface 510 and the radius of curvature of the curvilinear shape of the second emergent optical element 720 are determined using an optical design software such as the ZEMAX™ and/or Code V™ software.

The second incident optical element 620 also comprises a second proximal cavity allowing delimiting a proximal intersection area between the second incident surface and the first incident surface 210. This distal intersection area is common to the second incident surface and the first incident surface 210 and is in the form of a second proximal singular point, or more specifically a second proximal singular line at one of these ends thereby allowing delimiting the second incident surface from the first incident surface 210. More exactly, the second proximal singular point is a second proximal cusp point, more specifically a second first-order proximal cusp point partially formed by the convex shape of the second incident optical element 620.

Of course, in practice, the second proximal singular line is a second proximal cusp line, more specifically a second first-order proximal cusp line partially formed by the convex shape of the second incident optical element 620.

Thus, the composite lateral beam 960 incident to the second incident surface is refracted toward the emergent surface and more particularly toward the second emergent surface 710. The first emergent surface 410 is adjacent the second emergent surface 710.

According to another embodiment, the second emergent optical element 720 may have a curvilinear shape, more specifically a convex shape. More exactly, the second emergent optical element 720 may be in the form of a convex optical element configured to enable the emergent light rays to emerge at an angle comprised between 0° and 10°, in particular between 0° and 5° and preferably between 0° and 3° with respect to the main optical axis O-O.

Thus, the configuration of the second emergent optical element 720 and of the second incident optical element 620 enable a proper focalization of the light coming from the light source 901. In this manner, when a light source 901 is placed in the cavity of the optical system 100, all rays coming from the light source 901 and incident to the second incident surface 610 are refracted toward the second emergent optical element 720 so as to emerge at an angle comprised between 0° and 10°, in particular between 0° and 5° and preferably between 0° and 3° with respect to the main optical axis O-O.

When all the surfaces have been put into equation in order to focus the light without projecting the image of the light sources, it is necessary to uniformize the homogeneity of the color mixture using a three-dimensional texture set. The three-dimensional texture set, represented in FIGS. 6 to 10, comprises:
- a first three-dimensional texture 430 disposed on the first emergent surface 410 so as to form a first textured surface 460; and
- a second three-dimensional texture 730 disposed on the second emergent surface 710 so as to form a second textured surface 760.

The first three-dimensional texture 430 (represented in FIG. 6) and the second three-dimensional texture 730 (represented in FIG. 8) are calculated according to the first emergent surface 410 and to the second emergent surface 710 respectively; that is why the textured surface set comprises a first textured surface 460 and a second textured surface 760 independent of each other, in other words, the first textured surface 460 and the second textured surface 760 are the result of composed functions in order to enable a color mixture as homogenous and as uniform as possible. Expressed another way, when combined, the three-dimensional texture set and the emergent surface set have a synergetic effect.

The elementary pattern 431, 731 used by the first three-dimensional texture 430 forms a first network of elementary patterns 435. As explained before, this first network of elementary patterns 435 is configured to be dependent on the curvature of the first emergent surface 410, in other words the geometry of the first network of elementary patterns 435 and the geometry of the first emergent surface 410 are coordinated so as to homogenize and uniformize the color mixture.

To do so, the elementary pattern 431, 731 comprises a profile with a defined and finite shape, that is to say that the elementary profile is defined in a finite space so as to master the direction of the emergent light rays. The profile of the elementary pattern 431, 731 is defined by an elementary polynomial function $f(x,y)$ defined over a finite interval.

This elementary polynomial function $f(x,y)$ is configured so as to be continuously tangent to the curve of the first emergent surface 410. Indeed, as described before, the geometry of the elementary pattern 431, 731 and the geometry of the first emergent surface 410 are coordinated so as to homogenize and uniformize the color mixture, that is why the elementary polynomial function $f(x,y)$ has a set of equal first derivatives at the junction points between the elementary polynomial function $f(x,y)$ and the curve of the first emergent surface 410. In other words, the polynomial function is C1 continuous, that is to say that if the first textured surface 460 is scrupulously followed, the elementary pattern 431, 731 would have neither sharp angles nor ridges with the first emergent surface 410. In other words, the first textured surface 460 has a surface devoid of any recessed or protruding sharp ridge.

According to another embodiment, the profile of the elementary pattern 431, 731 may be defined by a Spline function defined over a finite interval. This Spline function is continuously tangent to the curve of the first emergent surface 410. In other words, the Spline function has a set of equal first derivatives at the junction points between the Spline function and the curve of the first emergent surface 410. In other words, the Spline function is C1 continuous; that is to say that if the first textured surface 460 is followed, the elementary pattern 431, 731 would have neither sharp angles nor ridges with the first emergent surface 410. In other words, the first textured surface 760 has a surface devoid of any recessed or protruding sharp ridge.

The profile of the elementary pattern 431, 731 defined by at least one of the functions among the elementary polynomial function $f(x,y)$ and the Spline function, has at least one symmetry among an axial symmetry, a planar symmetry and a rotational symmetry so as to have a homogenous color mixture.

Figure 8:
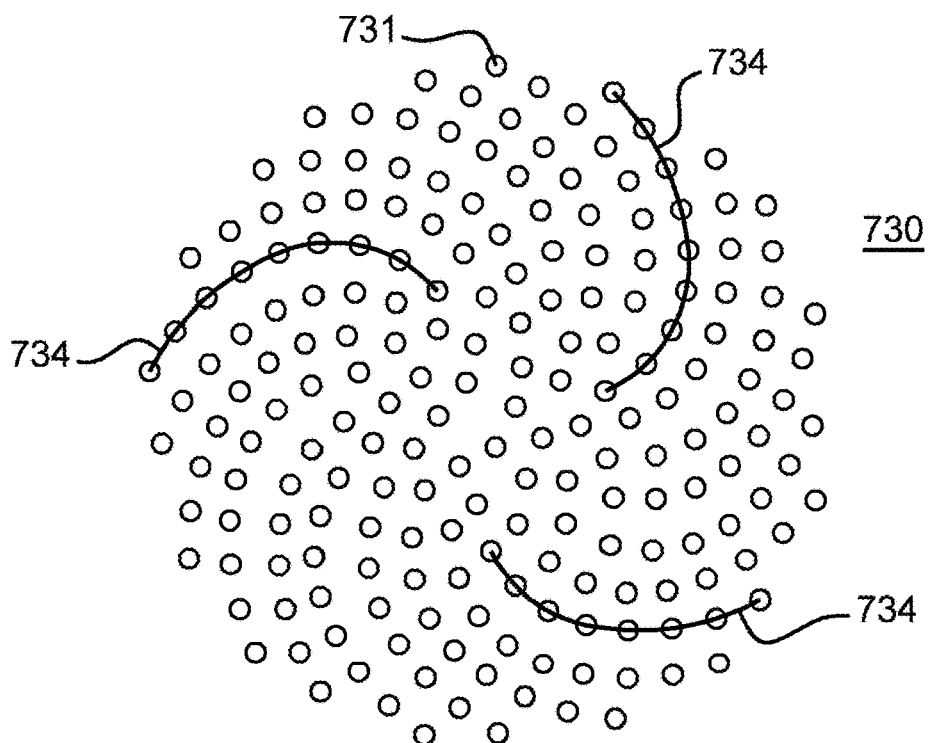
FIG. 8 represents a second three-dimensional texture according to an embodiment.
Figure 9:
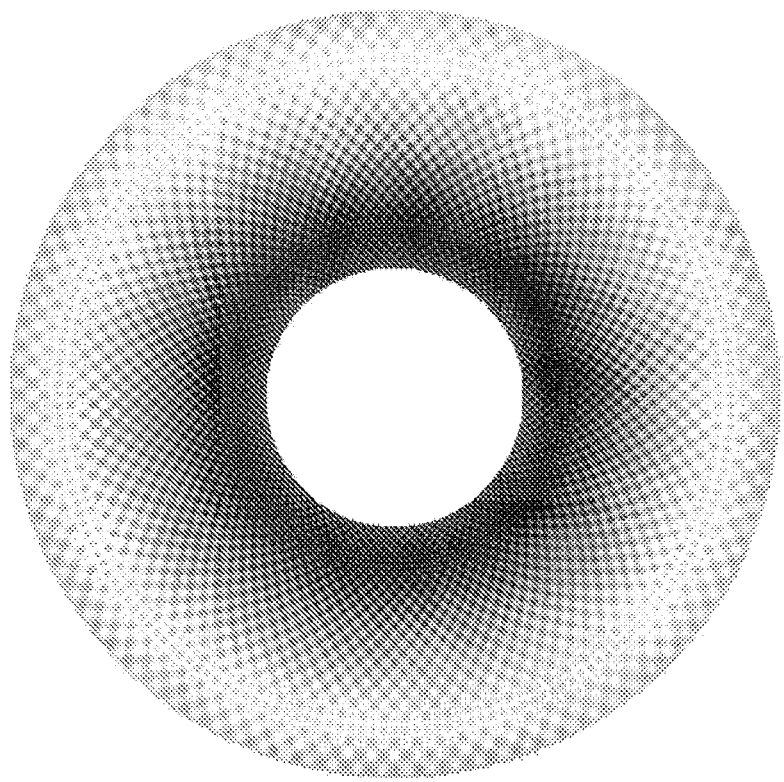
FIG. 9 discloses a top view of a second textured surface according to an embodiment.

As shown in FIG. 8, the elementary pattern 431, 731 may also be repeated by at least one translation according to at least one vector among a first primary vector 436, a second primary vector 437 and a third primary vector 438 of the primary reference frame 439, so as to distribute the elementary pattern 431 on the first emergent surface 410 in the form of a first network of homogenously distributed elementary patterns 435. In other words, the elementary pattern 431 is periodically repeated in the direction of at least one of the primary vectors of the primary reference frame 439.

According to one variant, at least two of the primary vectors among the first primary vector 436, the second primary vector 437 and the third primary vector 438 of the primary reference frame 439 may intersect at an intersection point so as to have a common origin. Thus, the elementary pattern 431 defined according to the first primary vector 436 and the elementary pattern 431 defined according to the second primary vector 437, for example, are configured to provide the first textured surface 460 or to provide smoothness to the first textured surface 460.

The intersection of at least two primary vectors of the primary reference frame 439 may form an angle comprised between 45° and 75°, in particular between 50° and 70° and in particular between 55° and 65° or an angle comprised between 100° and 140°, in particular between 110° and 130° and in particular between 115° and 125° depending on the selected primary vectors of the primary reference frame 439. These vectors intersections form a first network of elementary patterns 435 comprising meshes in the form of quadrilaterals and in particular in the form of lozenges.

The meshes of the first network of elementary patterns 435 thus formed comprise a set of crowns 432 that is to say a set of concentric circles, more exactly a set of concentric crowns 432 so as to significantly contribute to the uniformization of the color mixture. Each crown 432 of the set of concentric crowns comprise elementary patterns 431 equidistant from each other and equidistant with respect to at least one of the singular points among the first distal singular point 451 and the second distal singular point 455. Indeed, as expressed before, the first textured surface 460 is the result of composed functions in order to enable a color mixture as homogenous and as uniform as possible. That is why the first three-dimensional texture 430 and the first emergent surface 410 synergistically perform a homogenous and uniform color mixture.

Figure 11:
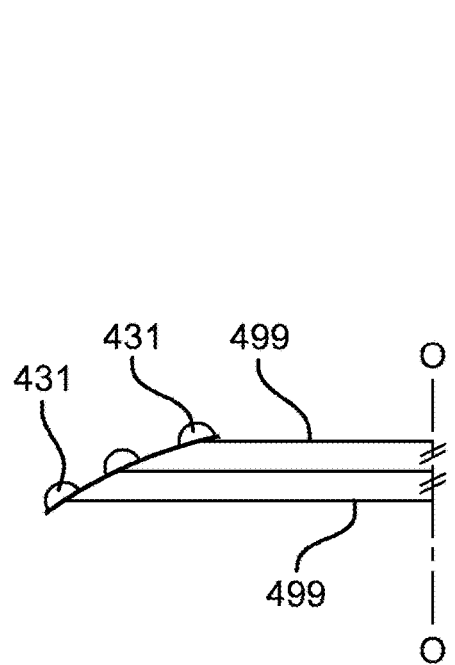
FIG. 11 illustrates an example of an elementary pattern distribution on a first emergent surface according to an embodiment.
Figure 12:
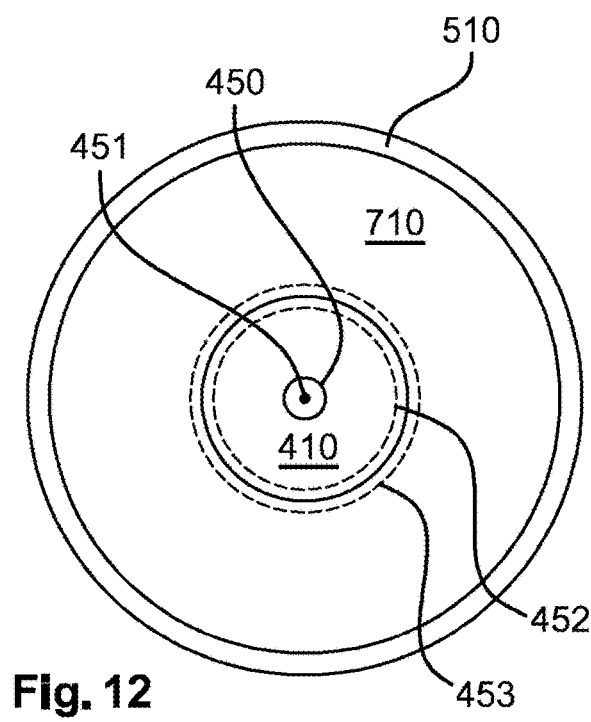
FIGS. 12 and 13 present schematic top and bottom views of the optical system according to an embodiment.
Figure 13:
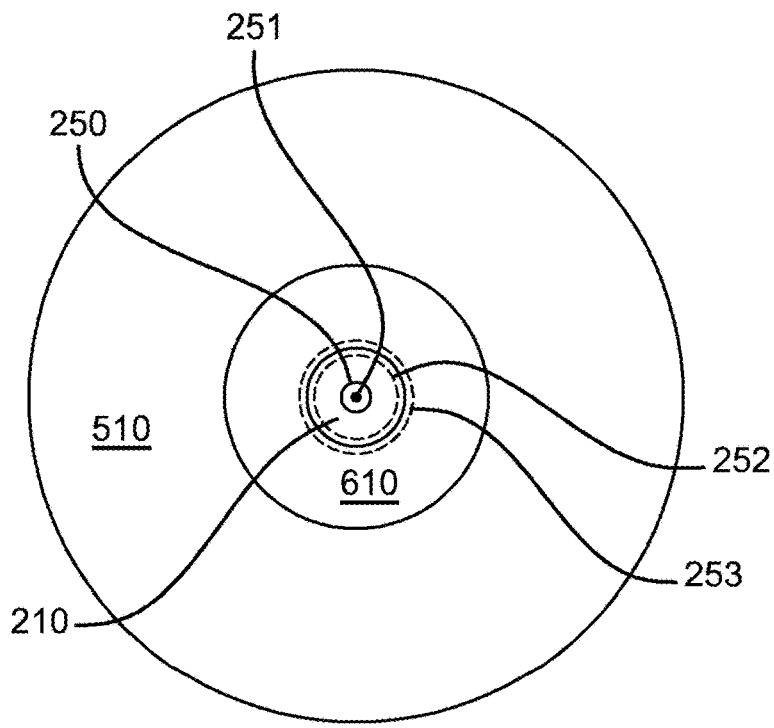
Figure 14:
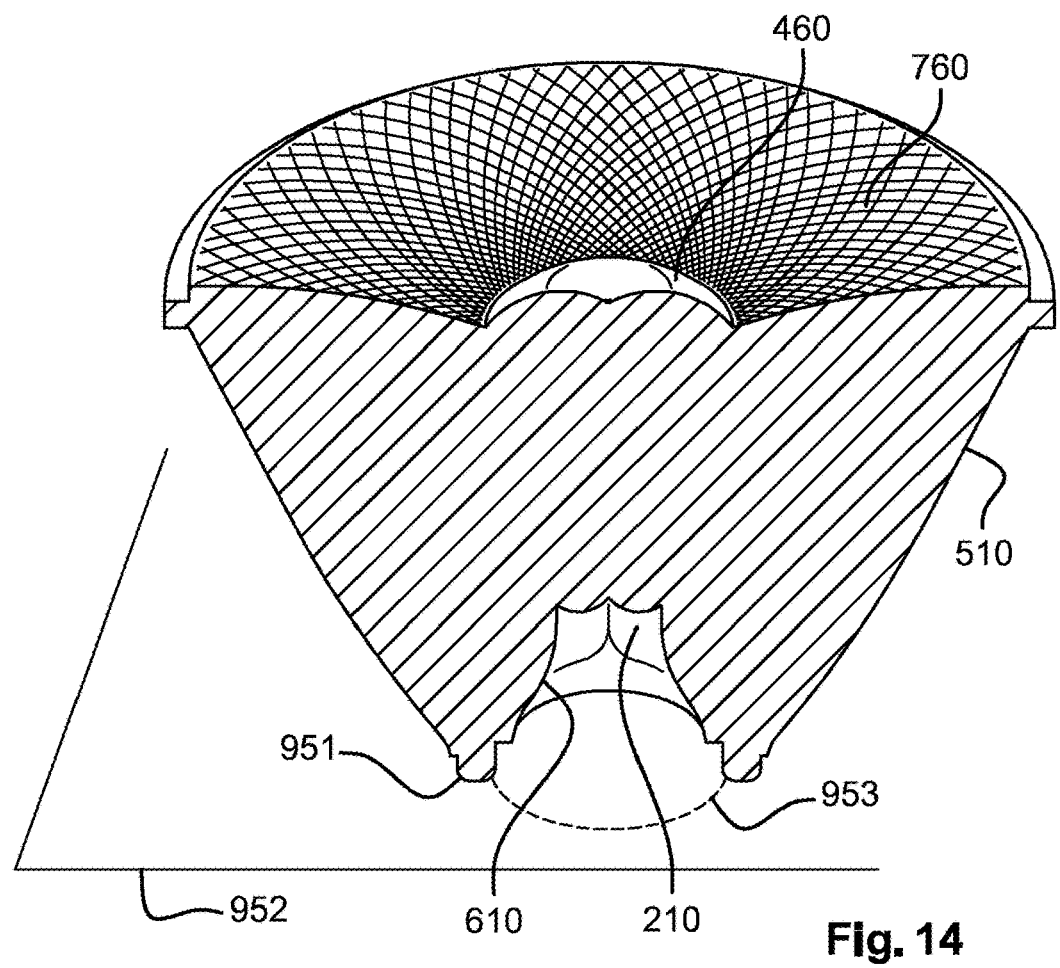
FIG. 14 discloses a perspective sectional view of the optical system according to an embodiment.

A crown 432 is configured to form a level 499 that is to say that each elementary pattern 431 forming the crown 432 is distributed at the same height on the first emergent surface 410. Thus, the set of concentric crowns 432 forms a set of levels 499 wherein the orthogonal projection of each level 499 is equidistant therebetween as shown in FIG. 11. This allows homogenizing and optimizing the color mixture by a geometry of the set of crowns 432 matching the geometry of the first emergent surface 410 having a first three-dimensional texture 430 with a first network of evenly distributed elementary patterns 435.

Depending on the curvature of the first emergent surface 410, the first three-dimensional texture 410 may have substantially even elementary patterns in order to optimize the homogenization and the uniformization of the color mixture. By substantially even, is meant an elementary pattern 431 at least one of its dimensions among the length, the width and the height is invariable in at least one of the directions of the first primary vector 436, the second primary vector 437 and the third primary vector 438 of the primary reference frame 439.

In FIG. 8, the second three-dimensional texture 730 has, in turn, a second network of elementary patterns 735. This second network of elementary patterns 735 is configured to be dependent on the curvature of the second emergent surface. Thus, the geometry of the second network of elementary patterns 735 and the geometry of the second emergent surface 710 are coordinate so as to homogenize and uniformize the color mixture.

To do so, the second network of elementary patterns is in the form of a plurality of spirals portions 734, namely in practice the number of spirals portions is between 96 and 128, so as to completely or partially cover the second emergent surface 710.

Figure 10:
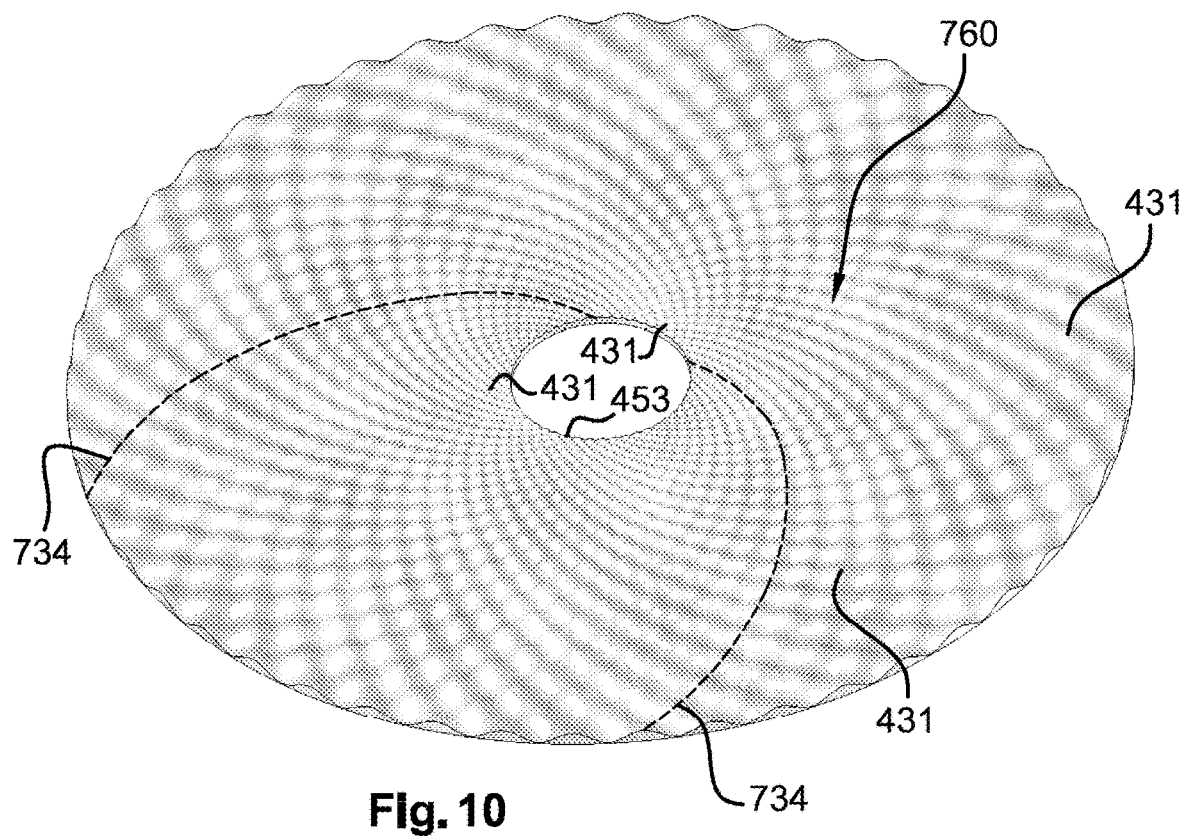
FIG. 10 shows a perspective view of a second textured surface according to an embodiment.

Each spiral portion 734 comprises elementary patterns 731 evenly distributed on the second emergent surface 710. A spiral portion 734 is not physically represented on the emergent surface but is in the form of a series of elementary patterns 731 which form a spiral portion 734, as represented in FIG. 8. Each spiral portion 734 originates on the distal common boundary, that is to say that it has a center located in the second distal cavity and more exactly on the second distal singular point 455. More specifically, each spiral portion 734 comprises a center located on the distal singular line, more exactly on the common distal singular line and deploys toward the upper peripheral border 790, that is to say toward the end of the second emergent surface 710 at an angle comprised between 30° and 60°, in particular between 40° and 50° and preferably between 43° and 47°. This deployment is performed both counterclockwise and clockwise. FIG. 10 illustrates an example.

The elementary pattern 731 comprises a profile with a defined and finite shape, that is to say that the elementary profile is defined in a finite space so as to master the direction of the emergent light rays, as specified before. The elementary polynomial function $f(x,y)$, forming the profile of the elementary pattern 731, is configured so as to be continuously tangent to the curve of the second emergent surface. Indeed, as described before, the geometry of the elementary pattern 731 and the geometry of the second emergent surface are coordinated so as to homogenize and uniformize the color mixture, that is why the elementary polynomial function $f(x,y)$ has a set of equal first derivatives at the junction points between the elementary polynomial function $f(x,y)$ and the curve of the second emergent surface. In other words, the polynomial function is C1 continuous, that is to say that if the second textured surface 760 is scrupulously followed, the elementary pattern 431, 731 would have neither sharp angles nor ridges with the second emergent surface. In other words, the second textured surface 760 has a surface devoid of any recessed or protruding shape ridge.

According to another embodiment, the profile of the elementary pattern 731 may also be defined by a Spline function defined over a finite interval. This Spline function is continuously tangent to the curve of the second emergent surface. In other words, the Spline function has a set of equal first derivatives at the junction points between the Spline function and the curve of the second emergent surface. In other words, the Spline function is C1 continuous, that is to say that if the second textured surface 760 is followed, the elementary pattern 731 would have neither sharp angles nor ridges with the second emergent surface.

The profile of the elementary pattern, represented by the reference 431 when it consists of the first emergent surface 410 and by the reference 731 when it consists of the second emergent surface 610, defined by at least one of the functions among the elementary polynomial function $f(x,y)$ and the Spline function, has at least one symmetry among an axial symmetry, a planar symmetry and a rotational symmetry so as to have a homogenous color mixture.

The profile of the elementary pattern 431, 731 is repeated by translation according to a first secondary vector of the secondary reference frame. More exactly, the elementary polynomial function $f(x,y)$ is actually repeated by translation according to the first secondary vector during the design. Thus, the elementary pattern 431, 731 is periodically repeated in the direction of the first secondary vector on the second emergent surface 710. During the evolution, or expressed another way, during the deployment of the spiral portion 734 on the second emergent surface 710, at least one of the dimensions of the elementary pattern 731 among the length, the width and the height, varies according to the distance of the first secondary vector with respect to the first emergent surface 410. More exactly, the profile of the elementary pattern 731 varies through a cylindrical symmetry. Indeed, the spiral portion 734 deploys in a logarithmic manner, that is to say that the set of elementary patterns composing the latter get wider as the elementary pattern gets away from the common distal singular line and approaches the upper peripheral border 790 or, in other words, the end of the second emergent surface 710. In other words, at least one of the dimensions among the length, the width and the height of the elementary pattern is modified by a homothety. FIG. 10 illustrates this example.

This cylindrical symmetry is configured to enable a transformation of the elementary pattern 731 by a homothety whose center is the main optical axis O-O.

The invention claimed is:

1. An optical collimator made of a material transparent to wavelengths comprised in a set of beams of light rays and intended to align said set of beams of light rays relative to a main optical axis from a light source comprising an emission axis and at least one emitting surface of light rays intended to be emitted in a space with a refractive index greater than or equal to one; said optical collimator comprising:

a first incident surface comprising a first proximal singular point located on the main optical axis;

a first emergent surface comprising a first distal singular point located on the main optical axis;

the first incident surface and the first emergent surface are configured so as to define an intermediate focus area located between the first incident surface and the first emergent surface.

2. The optical collimator according to claim 1, wherein the intermediate focus area has a rotationally symmetric shape.

3. The optical collimator according to claim 2, comprising a second incident surface, a second emergent surface, and a lateral surface configured to reflect by total internal reflection the light rays coming from the second incident surface toward the second emergent surface so that the light rays emerging from the second emergent surface are comprised within an angle comprised between at least one of the following ranges; 0° and 10°, 0° and 5° and 0° and 3° with respect to the main optical axis.

4. The optical collimator according to claim 2, comprising a three-dimensional texture set.

5. The optical collimator according to claim 1, comprising a second incident surface, a second emergent surface, and a lateral surface configured to reflect by total internal reflection the light rays coming from the second incident surface toward the second emergent surface so that the light rays emerging from the second emergent surface are comprised within an angle comprised between at least one of the following ranges; 0° and 10°, 0° and 5°, and 0° and 3° with respect to the main optical axis.

6. The optical collimator according to claim 5, wherein the second emergent surface and the first emergent surface are delimited by a second distal singular point.

7. The optical collimator according to claim 5, wherein the second incident surface and the first incident surface are delimited by a second proximal singular point.

8. The optical collimator according to claim 1, comprising a three-dimensional texture set.

9. The optical collimator according to claim 8, wherein the three-dimensional texture set comprises:
   a first three-dimensional texture disposed on the first emergent surface so as to form a first textured surface; and
   a second three-dimensional texture disposed on the second emergent surface so as to form a second textured surface.

10. The optical collimator according to claim 9, wherein the first three-dimensional texture comprises at least one first elementary pattern orientated on the first textured surface according to at least one vector of a primary reference frame.

11. The optical collimator according to claim 10, wherein the first elementary pattern is repeated by translation.

12. The optical collimator according to claim 9, wherein the first textured surface has a surface devoid of any recessed or protruding sharp ridge.

13. The optical collimator according to claim 9, wherein the second three-dimensional texture comprises at least one second elementary pattern orientated on the second emergent surface according to at least one vector of a secondary reference frame.

14. The optical collimator according to claim 13, wherein the second elementary pattern is repeated by a rotation about the main optical axis or by a homothety about the main optical axis.

15. The optical collimator according to claim 9, wherein the second textured surface has a surface devoid of any recessed or protruding sharp ridge.

16. The optical collimator according to claim 1, wherein the first emergent surface has a hemi-toroidal shape.

17. The optical collimator according to claim 1, wherein the first incident surface has a hemi-toroidal shape.

18. The optical collimator according to claim 1, wherein the singular point of the first incident surface and the singular point of the first emergent surface are located on the main optical axis of the optical system.

19. A luminous device for aligning a set of beams of light rays relative to a projection axis, comprising at least one light source and at least one optical collimator associated to each light source according to claim 1.

20. The luminous device according to claim 19, wherein each light source comprises at least two and preferably four light rays emitting surfaces, preferably with a different color per emitting surface, each emitting surface being preferably offset with respect to the main optical axis of the optical collimator associated thereto.

* * * * *